United States Patent [19]

Kawamura et al.

[11] Patent Number: 4,918,474
[45] Date of Patent: Apr. 17, 1990

[54] CAMERA

[75] Inventors: Masaharu Kawamura; Shosuke Haraguchi; Hideki Morishima, all of Kanagawa, Japan

[73] Assignee: Canon Kabushiki Kaisha, Tokyo, Japan

[21] Appl. No.: 305,857

[22] Filed: Feb. 3, 1989

[30] Foreign Application Priority Data

Feb. 8, 1988 [JP] Japan .................................. 63-028183

[51] Int. Cl.⁴ .......................... G03B 1/18; G03B 1/66; G03B 17/36
[52] U.S. Cl. ................................. 354/173.1; 354/217; 354/268
[58] Field of Search ................ 354/173.1, 173.11, 217, 354/266, 268

[56] References Cited

U.S. PATENT DOCUMENTS 4,460,256  7/1984  Araki et al. ..................... 354/173.11
4,728,976  3/1988  Takahashi et al. ............. 354/217 X Primary Examiner—Michael L. Gellner
Attorney, Agent, or Firm—Fitzpatrick, Cella, Harper & Scinto

[57] ABSTRACT

A motor-driven camera of the prewind type arranged to perform a preliminary film winding action continuously from an automatic film loading onto a take-up spool before photographing and, thereafter, to rewind the film for every photographing shot includes an electric film counter arranged to count the number of frames of the film according to the transport of the film, a detecting device for detecting the movement of the film, and a detecting circuit which detects a cause for the immovable state of the film when the detecting device has detected the immovable state of the film. The detecting circuit is arranged to determine the preliminary film winding action to have been completed when a counted value of the electric film counter is greater than a predetermined value, or to determine the automatic film loading to have failed when the counted value is not greater than the predetermined value.

25 Claims, 20 Drawing Sheets

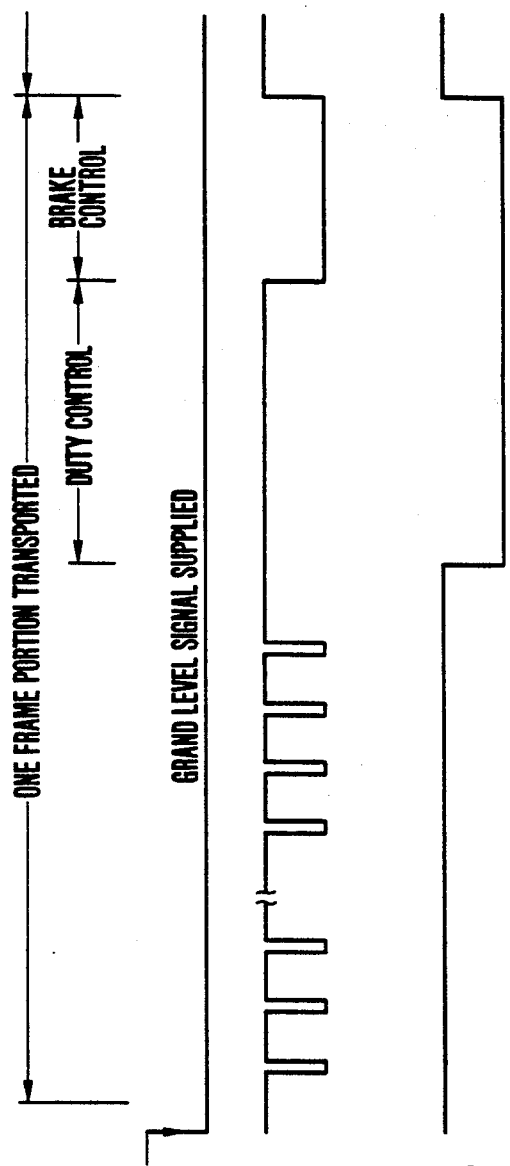

CAMERA

BACKGROUND OF THE INVENTION

1. Field of the Invention

This invention relates to a motor-driven camera of the prewind type in which all frame portions of film are preliminarily wound onto a take-up spool and then the film is rewound for every photographing shot.

2. Description of the Related Art

The so-called automatic film loading by which blank film winding is performed when a camera is loaded with a roll of film is intended to ensure that the leader part of the film is reliably wound onto a spool of the camera. However, the automatic film loading would fail if the position of the film perforation does not coincide with the teeth of a sprocket or if the leader part is not placed in a designated position. It has been practiced to wind several frame portion film by using a motor or the like and, at the same time, to detect a movement of the film. Then, if no movement is detected, the automatic film loading is considered to have failed.

However, in the case of a camera of the prewind type, the film loading process for winding a part of the film onto the spool of the camera is immediately followed by a continuous film winding process for winding the film onto the spool to the end part of the film. In accordance with the prewind system, therefore, it is impossible to find the entire length of the film until completion of the prewinding action. The lengths of the commercially available film products are limited to several different lengths. In some cases, however, the photographer wishes to cut the film to a desired length before use. The camera should be arranged to be capable of handling such a film length. If the automatic film loading is determined to have failed by detecting the movement of the film in accordance with the conventional method in such a case, the automatic film loading would be determined to have failed, despite the performance of the loading, as the film comes to a stop also upon completion of the prewinding action.

For a camera having a prewind system, a method for making a discrimination between the failure of the automatic film loading and the completion of the preliminary film winding has been disclosed in U.S. Pat. No. 4,460,256. This patent is for a motor-driven camera. The camera has a prewind system and is arranged to have all the frame portions of film first wound in response to closing of the back lid of the camera; and, after that, each of the frame portions of film is rewound back into a film cartridge at the end of every photographing shot. More specifically, the camera is provided with a mechanical film counter mechanism. The rotation of a sprocket is used as a drive source for rotating a disc-shaped counter plate. The film count value is indicated by rotating this counter plate to a degree corresponding to one frame at a time. The film counter mechanism includes a detecting mechanism. The detecting mechanism consists of a cam and an operating piece and changes the state of a switch in response to the movement of the operating piece. The cam is provided with a cut-out part which corresponds to three frames. When a three-frame portion of the film is wound after commencement of the prewinding action, the operating piece swings by riding over the cam from the cut-out part to change the state of the switch. In the case of this patent, the failure of the automatic film loading is detected by operating the detecting mechanism in combination with an electric timer. More specifically, the camera is arranged to determine that an automatic film loading action has failed if the state of the switch does not change within a given period of time set at the electric timer from the start of the prewinding action after the back lid of the camera is closed. Upon detection of the failure of the film loading, the film driving motor is immediately brought to a stop.

SUMMARY OF THE INVENTION

One aspect of this invention resides in the provision of a camera which is arranged such that: in a case where the film comes to a stop during the process of preliminary film winding, a film count value currently obtained at an electric film counter is compared with a predetermined value. Then, a discrimination is made between the failure of the automatic film loading and the completion of the prewinding action according to the result of that comparison. The invented arrangement is capable of accurately making a discrimination between the failure of the automatic film loading and the completion of the prewinding action process even in cases where the film is cut to a short length before use. It is an advantage of the invention over the above-stated prewind type camera of the prior art that the invented arrangement dispenses with the use of the mechanical cam and the operating piece mentioned in the foregoing description of the prewind type camera.

BRIEF DESCRIPTION OF THE DRAWINGS

FIG. 3(a) shows a state obtained at the beginning of the prewinding action. FIG. 3(b) shows a state in which the leader part of the film has been taken up onto the spool in the initial stage of the prewinding action. FIG. 3(c) shows a state in which the back lid of the camera is in an open state.

FIG. 6 is a time chart showing the timing of signals obtained from the terminals provided on the detection substrate of FIG. 5.

FIG. 7(a) shows an initial state or in a state obtained at the time of the prewinding action. FIG. 7(b) shows a mirror-up state which a mirror has been raised. FIG. 7(c) shows a mirror-down state in which the mirror has been lowered after actuation of the mirror box driving mechanism.

FIG. 9(a) shows an initial state or a state obtained at the time of the prewinding action. FIG. 9(b) shows a state in which the mirror box driving mechanism is operated by the reverse rotation of a motor. FIG. 9(c) shows a state in which the film rewind driving mechanism is operated by the normal rotation of the motor. FIG. 9(d) shows a state in which the back lid of the camera has been opened.

FIG. 10(a) shows an initial state, or in a state obtained at the time of the prewinding action. FIG. 10(b) shows a state in which the mirror box driving mechanism is operated by the reverse rotation of the motor. FIG. 10(c) shows a state in which the film rewind driving mechanism is operated by the normal rotation of the motor. FIG. 10(d) shows a state in which the back lid has been opened.

DETAILED DESCRIPTION OF THE PREFERRED EMBODIMENT

Figure 1:
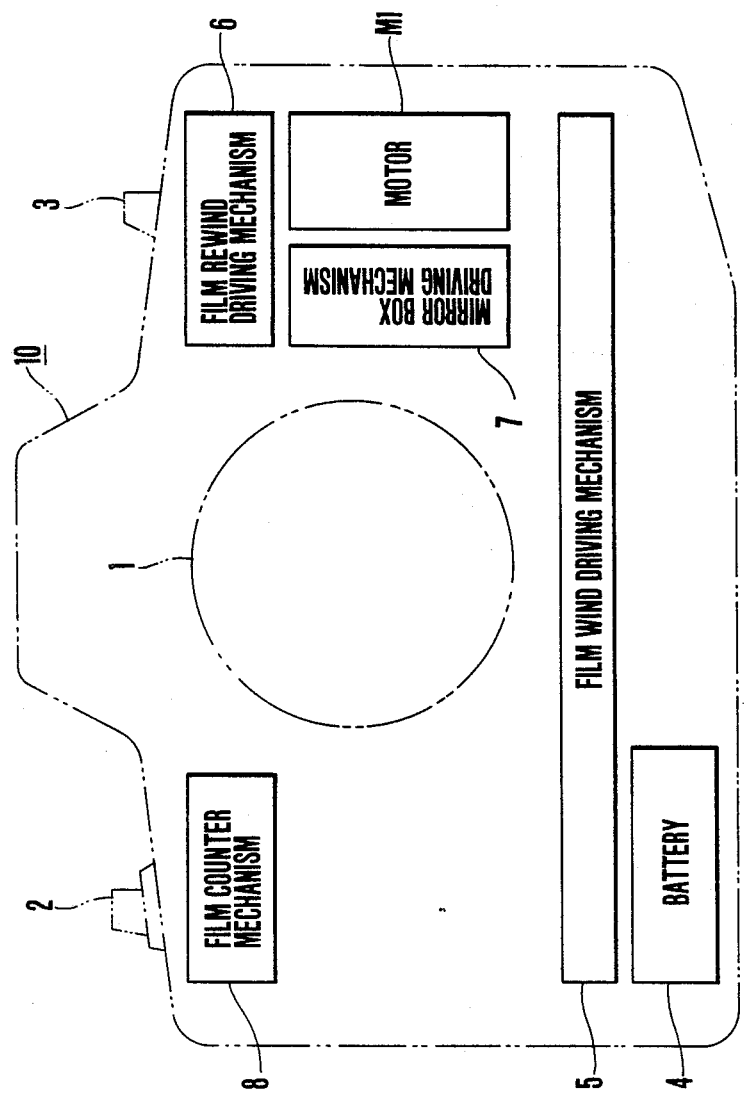
FIG. 1 is an illustration showing in outline the arrangement of a single-lens reflex camera arranged according to this invention as an embodiment thereof.

The following describes an embodiment of this invention with reference to the accompanying drawings. In this case, the invention is applied to a single-lens reflex camera. FIG. 1 shows in outline the arrangement of the single-lens reflex camera. A photo-taking lens 1 is detachably mounted on a camera body 10. The illustration includes a shutter release button 2, a film rewinding button 3 which is arranged to cause all the frame portions of film to be forcedly rewound, and a battery 4 which is disposed in the bottom part of the camera body 10. The camera body 10 is provided with a member which serves as a battery lid and which is readily removable when taking out the battery from a battery holding chamber for replacing it with a new battery. A motor M1 is arranged to serve as a drive source not only for film winding and rewinding systems but also for charging a front panel system and for driving a mirror. The illustration further shows a film wind driving mechanism 5, a film rewind driving mechanism 6, a mirror box driving mechanism 7, and a film counter mechanism 8.

The details of the above-stated arrangement are as described below with reference to FIG. 2 and other figures showing the details of the respective components of the invention.

First, the motor M1 has two output shafts including upper and lower output shafts. The two output shafts are arranged to rotate in synchronism with each other.

Next, the film wind driving mechanism 5 is arranged as follows: Referring to FIG. 2, a first pinion 20 is secured to the lower output shaft of the motor M1. A transmission gear 22 meshes with the first pinion 20. The transmission gear 22 is connected to a sun gear 26 via a connection shaft 24. Gears 26 and 28 and a planetary lever 30 are arranged to jointly form a planetary clutch mechanism. The planet gear 28 meshes with the sun gear 26 and is arranged to be revolved by the planetary lever 30 which is friction-coupled with the sun gear 26. A transmission gear 32 is disposed at a position where it meshes or does not mesh with the planet gear 28 according to the revolution of the planet gear 28. When the sun gear 26 rotates counterclockwise to revolve the planet gear 28, the transmission gear 32 meshes with the planet gear 28 to transmit the rotation of the motor M1. When the sun gear 26 is caused to rotate clockwise by the reverse rotation of the motor M1, the planet gear 28 is disengaged from the transmission gear 32. Transmission gears 34 and 36 are arranged to transmit the rotation of the transmission gear 32. The gear 36 is a double gear and meshes with another sun gear 38.

Gears 38 and 40 and a first planetary lever 42 form a first planetary clutch mechanism. The small gear part of the sun gear 38 which is a double gear meshes with a first planet gear 40 which is revolvable by the first planetary lever 42 (friction-coupled with the small gear part of the sun gear 38). Gears 38 and 46 and a second planetary lever 44 form a second planetary clutch mechanism. The small gear part of the sun gear 38 further meshes with the second planet gear 46 which is revolvable by the second planetary lever 44 (friction-coupled with the small gear part of the sun gear 38). A spool driving transmission gear 48 is disposed in a position where it meshes or does not mesh with the first planet gear 40 according to the revolution of the first planet gear 40. When the first planet gear 40 is caused to revolve by the clockwise rotation of the sun gear 38, the transmission gear 48 meshes with the first planet gear 40 to transmit the rotation of the motor M1. When the motor M1 rotates in a reverse direction, the transmission of rotation of the motor 1 is cut off by the above-stated planetary clutch mechanism (26, 28, 30) which is disposed on the upstream side of the film wind driving mechanism 5. In that event, therefore, the first planetary lever 42 does not turn counterclockwise.

A spool gear 50 is arranged to drive a spool 52 for taking up a film. The spool gear 50 constantly meshes with the transmission gear 48 and is secured to the above-stated spool 52 although the spool gear 50 is illustrated in FIG. 2 as being located away from the spool 52. On the circumferential surface of the spool 52 are formed spool claws 52a which are arranged to engage a perforation provided in a roll of film F.

A transmission gear 54 is a double gear arranged to drive a sprocket. The large gear part of the gear 54 is disposed in a position where it meshes or does not mesh with the second planet gear 46 according to the revolution of the second planet gear 46. When the sun gear 38 rotates clockwise, the gear 54 meshes with the second planet gear 46 due to the revolution thereof to transmit the rotation of the motor M1. A sprocket gear 56 is arranged to drive a driving sprocket 58. The sprocket gear 56 constantly meshes with the small gear part of the transmission gear 54 and is in a rotatory association with the driving sprocket 58. Although a mechanism for associating the sprocket gear 56 with the driving sprocket 58 is omitted in FIG. 2 for the sake of simplification of illustration, they are in actuality rotatively associated with each other. The driving sprocket 58 is provided with teeth 58a which are arranged to be capable of meshing with the perforation of the film F.

The spool 52 is arranged to be greater in a circumferential speed ratio than the driving sprocket 58.

In the neighborhood of the fore end part of the second planetary lever 44 of the second planetary clutch mechanism, there is provided a structural arrangement for disengaging the second planet gear 46 from the transmission gear 54 and for keeping them in the disengaged state. The details of this structural arrangement are as described below with reference to FIGS. 3(a), 3(b) and 3(c) which are bottom plan views showing the essential parts of the arrangement:

The second planetary lever 44 is provided with a notch 44a, a projection 44b and a hill-shaped click part 44c which are formed near to the fore end of the lever 44. A reset lever 60 is arranged to be swingable around its rotation center 60a. The lever 60 has a restricting part 60b which is in a bent shape, a first projection 60c, and a second projection 60d which protrudes toward the back lid of the camera. A holding lever 62 is concentrically carried by the rotation center 60a of the reset lever 60 and is arranged to be swingable to a small degree of angle which is restricted by the above-stated restricting part 60b. This holding lever 62 is provided with a pin 62a which is disposed in a position corresponding to the notch 44a of the second planetary lever 44 and a click projection 62b which is disposed in a position corresponding to the above-stated hill-shaped click part 44c. A holding spring 64 is secured to the above-stated reset lever 60 and is arranged to elastically push the holding lever 62 to cause the click projection 62b to abut on the click part 44c. A reset spring 66 is elastically pushing the reset lever 60 counterclockwise as viewed on FIGS. 3(a), 3(b) and 3(c). A reference numeral 70 denotes the back lid of the camera which is pivotally carried by a shaft 70a and is arranged to be opened and closed as desired. With the back lid 70 in a closed state, a pushing part 70b of the back lid 70 pushes the above stated second projection 60d of the reset lever 60 to cause the reset lever 60 to be pushed into its position as shown in FIGS. 2, 3(a) and 3(b) and keeps it there against the force of the above-stated reset spring 66.

Figure 3A:
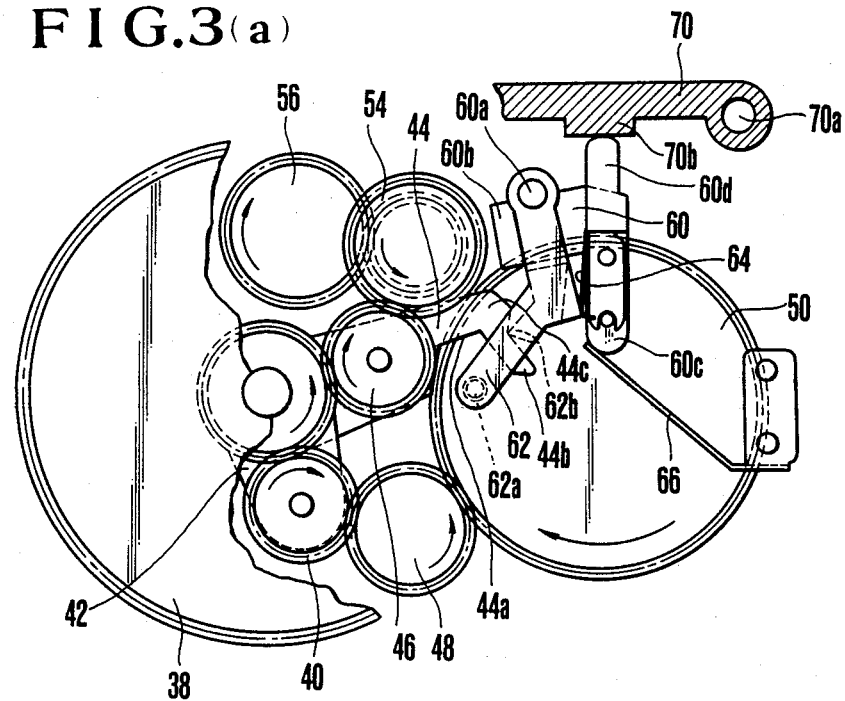
FIGS. 3(a), 3(b) and 3(c) show the operation of the essential parts disposed on the side of the spool of a film wind driving mechanism as viewed from below their positions shown in FIG. 2. Among these figures.

Under the condition in the beginning of a film winding action, as shown in FIG. 3(a), therefore, the second planetary lever 44 causes the planet gear 44 to mesh with the transmission gear 54. When a portion of the leader part of the film is taken up onto the spool 52, the driving sprocket 58 comes to be driven by the movement of the film F, and then the rotational frequency of the second planet gear 46 no longer coincides with that of the transmission gear 46. In the initial stage of film winding, therefore, a rotating force is exerted as a repulsing force on the second planetary lever 44 to be turned clockwise in FIG. 3(a). This force causes the lever 44 to turn clockwise. The turning motion causes the click projection 62b to ride over the click part 44c, as shown in FIG. 3(b). This disengages the second planet gear 46 from the transmission gear 54. Under this condition, the holding lever 62 is pushed by the holding spring 64 toward the second planetary lever 44. The holding lever 62 then has the click projection 62b push the click part 44c on a part extending from its top to its slanting side face and is thus kept in that position. This state which is shown in FIG. 3(b) is kept until the back lid 70 is opened next time. In this state, it is only the spool 52 that exerts a driving force for winding the film F (spool drive).

Figure 3B:
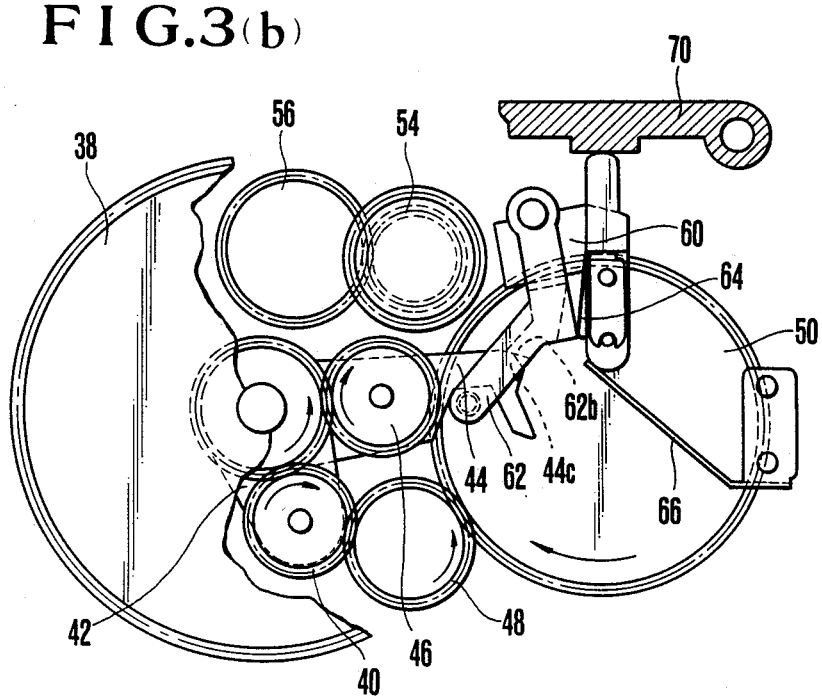
Figure 3C:
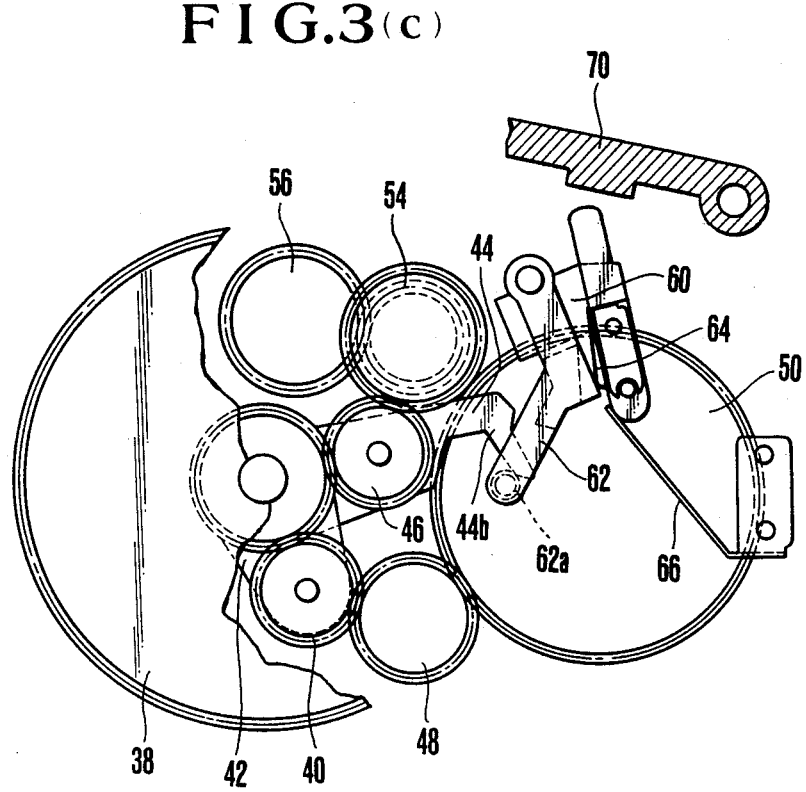

When the back lid 70 is opened as shown in FIG. 3(c), the reset lever 60 swings counterclockwise by the pushing force of the reset spring 66. Therefore, the holding lever 62 likewise swings counterclockwise. This time, the pin 62a pushes the projection 44b of the second planetary lever 44 to swing the lever 44 counterclockwise. This brings the second planet gear 46 back to its initial position where it is allowed to mesh with the transmission gear 54.

Figure 4:
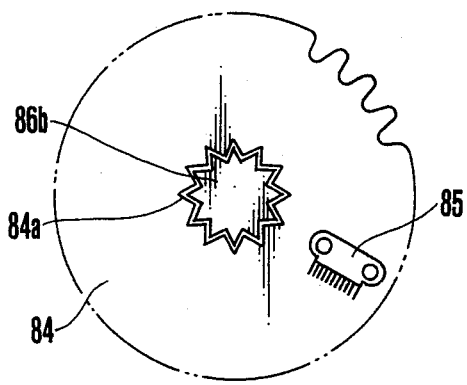
FIG. 4 shows a detection gear of FIG. 2 as viewed from below.

The details of the film counter mechanism 8 and the film transport detecting mechanism are arranged as follows. Referring again to FIG. 2, a reference numeral 80 denotes a follower sprocket. The follower sprocket 80 is not associated with the above-stated driving sprocket 58 and is arranged to rotate only by following the movement of the film F. A transmission gear 82 is secured to the follower gear 80. A detection gear 84 meshes with the transmission gear 82 and is arranged to make one turn while one frame portion of film (normally having eight perforation holes) is transported. A counter advancing shaft 86 has a cutout tooth 86a formed in the upper end part thereof and is arranged to rotate in association with the detection gear 84. Referring to FIG. 4, the associated rotation of the counter advancing shift 86 and the detection gear 84 is caused by the engagement of external teeth 86b formed at the lower end of the shaft 86 with inner teeth 84a formed in the middle hole of the detection gear 84. The external teeth 86b and the inner teeth 84a are arranged to mesh with each other loosely in the radial direction. Therefore, the counter advancing shaft 86 is movable to a slight extent in the radial direction of the detection gear 84. A counter gear 88 is rotatably carried by its center shaft 88a and is being urged to rotate clockwise by a spring which is not shown. The circumferential face of the counter gear 88 has a toothed part 88b which is arranged to rotate one pitch degree when the counter advancing shaft 86 makes one turn. On the upper surface of the counter gear 88 is provided a film frame number indicator 88c which has frame numerals spaced to a degree coinciding with the pitch of the toothed part 88b. A counter reset lever 90 is swingably carried by its center shaft 90a and is provided with a protruding pin 90b which is arranged to be pushed by the pushing part 70c of the back lid 70 when the back lid 70 is closed and a pushing part 90c which is arranged to push the counter advancing shaft 86 when the counter reset lever 90 swings counterclockwise. A spring 92 has its middle part carried by a pin 90d which is provided on the counter reset lever 90. One end of the spring 92 abuts on a fixed pin 92a while the other end abuts on the counter advancing shaft 86. While the back lid 70 is closed, as shown in FIG. 2, the spring 92 elastically pushes the counter advancing shaft 86 toward the center of the counter gear 88 to ensure that the toothed part 88b of the counter gear 88 is in contact with the upper end part of the counter advancing shaft 86 (having the cutout tooth 86a). This ensures an adequate advancing action of the gear 88 and prevents it from coming back to its initial position. When the back lid 70 is opened, the counter reset lever 90 is released from its state of being held in position. This allows the counter reset lever 90 to swing counterclockwise by the urging force of the spring 92. The pushing part 90c of the lever 90 then pushes the counter advancing shaft 86 in the direction opposite to the counter gear 88. This leaves the counter gear 88 in a freely movable state. The force of a spring which is not shown then causes the counter gear 88 to rotate clockwise back to its initial position where a mark "E" appears in an indication window which is provided for showing the film frame number. When the back lid 70 is closed after this, the upper end part of the counter advancing shaft 86 again enters the toothed part 88b of the counter gear 88. This enables the cutout tooth 86a to intermittently advancing the gear 88 by one tooth in the direction of incrementing the frame number.

Figure 5:
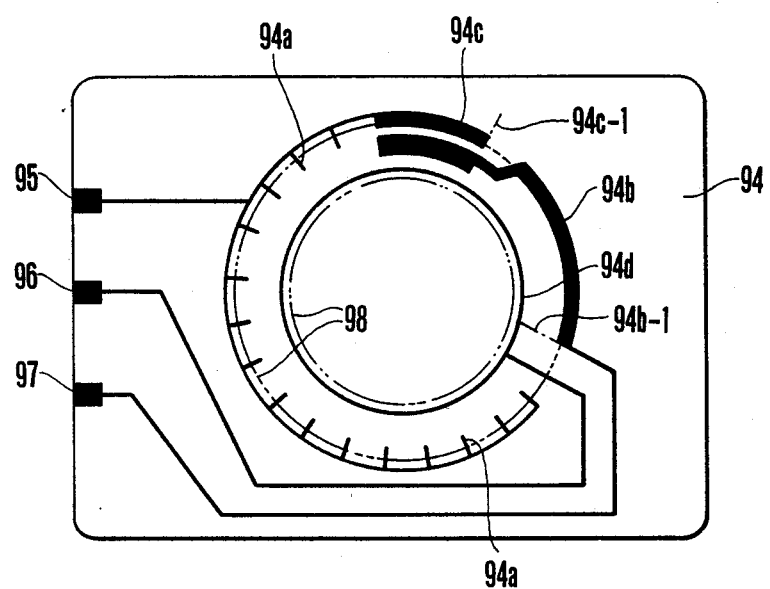
FIG. 5 shows a detection substrate of FIG. 2 as viewed from above.

A detection substrate 94 is disposed beneath the detection gear 84. The detection gear 84 and the detection substrate 94 jointly form a mechanism for detecting the transport amount of the film F. The details of the film transport amount detecting mechanism are shown in FIGS. 4 and 5.

FIG. 4 shows the detection gear 84 as viewed from the reverse side thereof. A sliding brush 85 is attached to the reverse side of the gear 84. FIG. 5 shows the detection substrate 94 as viewed from the obverse side thereof. A comb-shaped pattern 94a, a duty control pattern 94b, a brake control pattern 94c and a ground pattern 94d are formed within a sliding area of the above-stated brush 85 which is caused by the rotation of the detection gear 84. These pattern 94a to 94d are connected to terminals 95 to 97, respectively. Further, two-dot chain lines 98 in FIG. 5 indicate the sliding area of the sliding brush 85 which in actuality has the sliding width of the brush 85. A ground level signal is supplied to the terminal 96 by a circuit which will be described later. This makes it possible to detect a movement signal (a pulse signal) by the terminal 95 during a film frame advancing process. A duty control range which is obtained near the end of the film frame advancing process can be detected by the terminal 97. Further, a brake control range which is obtained at the end of the film frame advancing process can be detected by the terminals 95 and 97. More specifically, referring to FIG. 6 which is a time chart showing the film rewinding process, the film advancing amount detection is carried out as follows. With the ground level signal supplied to the terminal 96, a pulse signal is obtained at the terminal 95 as the sliding brush 85 is first brought into sliding contact with the comb-shaped pattern 94a and the ground pattern 94d by a rewinding action on one frame portion of the film. The generating interval of the pulse signal is in synchronism with the film transport speed. Therefore, it can be detected that the film F is being appositely transported (either for winding or rewinding) if the generating interval of the pulse signal is shorter than a predetermined period of time. If the generating interval is longer than the predetermined period of time, it indicates either that the voltage of the battery has dropped or that film winding or rewinding has been completed for all the frame portions to have either a so-called film stretching state or a state of having the film completely taken up into the film cartridge.

Next, a ground level signal is obtained at the terminal 97 when the sliding brush 85 slides on the duty control pattern 94b and the ground pattern 94d. The start end 94b-1 of the duty control pattern 94b is set in such a way as to have the timing of the ground level signal in synchronism with a time point near the end of rewinding of one frame portion of the film F (frame advance). Then, in order to reduce the speed of the motor M1 after this point, a speed reducing control is accomplished by changing the power supply from a full power supply mode over to a duty pulse power supply mode.

Further, when the sliding brush 85 comes into sliding contact with all of the duty control pattern 94b, the brake control pattern 94c and the ground pattern 94d, a ground level signal is obtained at both the terminals 95 and 97. The start end 94c-1 of the brake control pattern 94c is set in such a way as to have the timing of this ground level signal in synchronism with a point which is set immediately before the end of rewinding of one frame portion of the film F (in anticipation of an over-run extent). In order to stop the motor M1 rapidly after this point, a stopping control is accomplished by switching over to a short-circuit mode.

The details of the film rewind driving mechanism 6 and those of the mirror box driving mechanism 7 are as follows. Again referring to FIG. 2, a second pinion 100 is secured to the upper output shaft of the motor M1. A transmission gear 102 which is in the form of a double gear meshes with the second pinion 100. Parts 104, 106 and 108 form a planetary clutch mechanism. A sun gear 104 which is in the form of a double gear meshes with the transmission gear 102. A planet gear 106 which is in the form of a double gear meshes with the sun gear 104 and is arranged to be revolvable by a planetary lever 108 which is friction-coupled with the sun gear 104. A rewind gear 110 is disposed in a position in which it meshes with the small gear part of the planet gear 106 according to the revolution of the planet gear 106 in a first direction (the clockwise rotation of the sun gear 104 caused by the clockwise rotation of the motor M1). A rewind fork 112 is arranged to mesh with the shaft of a film cartridge in a known manner. The fork 112 is strongly friction-coupled with the rewind gear 110.

Figure 7A:
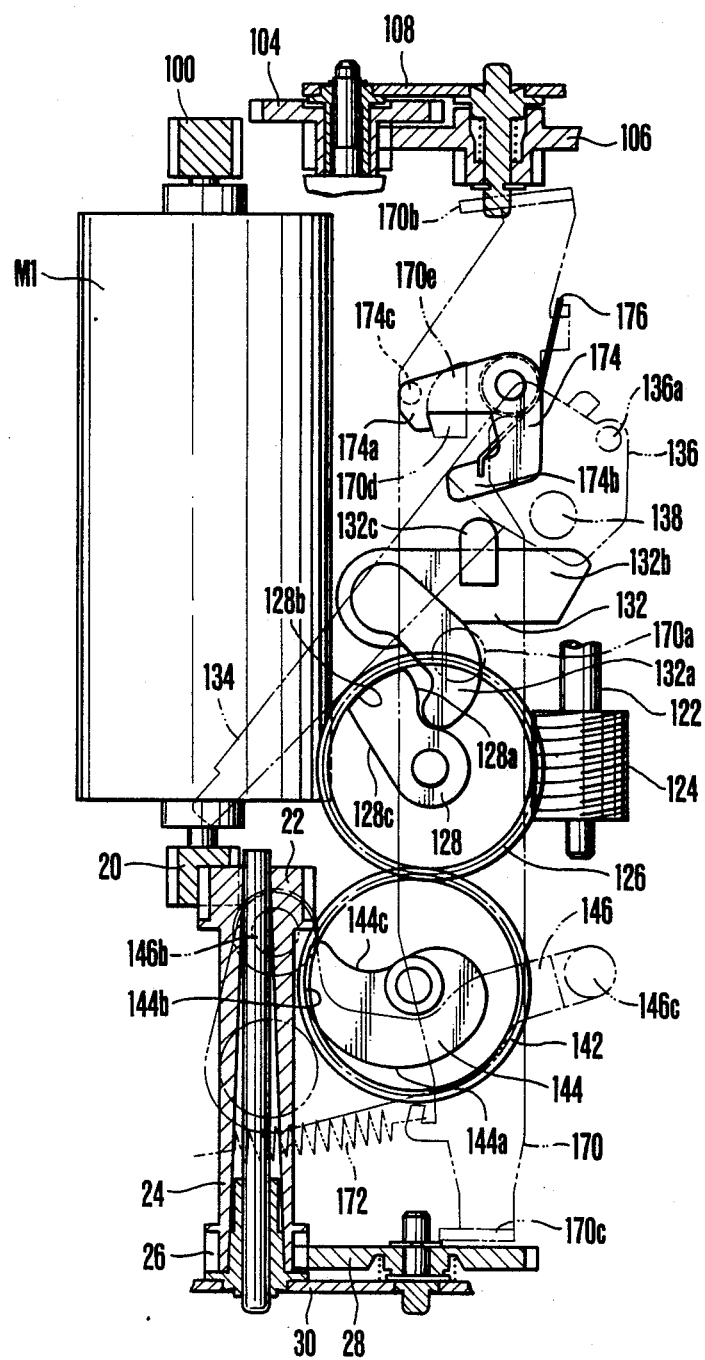
FIGS. 7(a), 7(b) and 7(c) show the operation of a film rewind driving mechanism and a mirror box driving mechanism as viewed from one side. Among these figures.
Figure 7B:
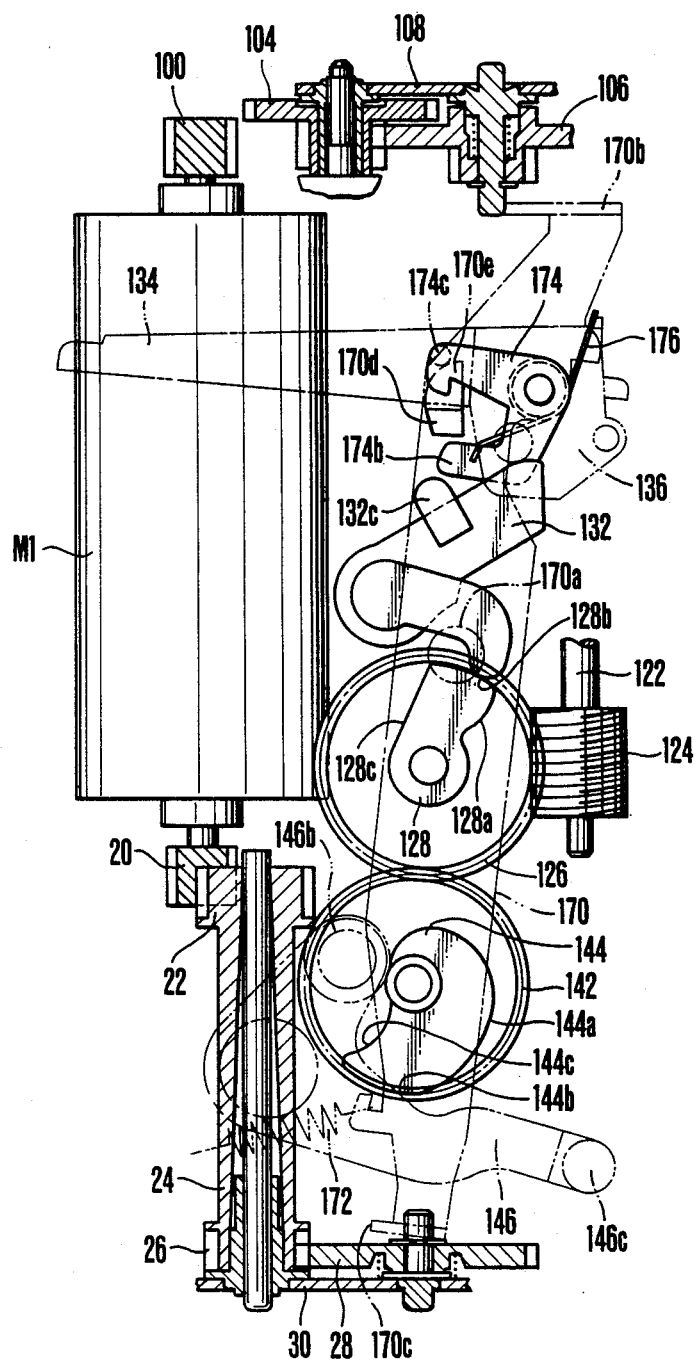

A transmission gear 120 is included in the mirror and shutter-charging drive and transmission system and is arranged in a position in which it meshes with the large gear part of the planet gear 106 according to the revolution of the planet gear 106 in a second direction (the counterclockwise rotation of the sun gear 104 caused by the counterclockwise rotation of the motor M1). A transmission shaft 122 has one end thereof secured to the transmission gear 120 and the other end to a worm gear 124. A mirror driving gear 126 is arranged to mesh with the worm gear 124 and to rotate clockwise when the motor M1 rotates counterclockwise. The gear 126 has a mirror driving cam 128 formed on its obverse side in one unified body therewith. To the reverse side of the mirror driving gear 126 is secured a position detecting brush 130 which will be described later herein. A mirror driving lever 132 consists of two lever bodies and serves as a cam follower for the above-stated mirror driving cam 128. More specifically, the mirror driving lever 132 is arranged to be driven to rotate counterclockwise by the mirror driving cam 128 when one end part 132a of the lever 132 comes into sliding contact with an uprising cam face 128a of the cam 128 (see FIGS. 7(a), 7(b) and 7(c)); to keep on rotating counterclockwise when the end part 132a is in sliding contact with a level cam face 128b (see FIGS. 7(a), 7(b) and 7(c)); and to be allowed to resume its clockwise rotation when the end part 132a comes either into sliding contact with a descending cam face 128c or to a position corresponding to the face 128c. The mirror driving lever 132 drives a mirror by the other end part 132b swinging under the control of the rotating position of each cam face of the mirror driving cam 128. A reference numeral 134 denotes a movable mirror which is turnably carried to have two positions. One is a finder sighting position (or a mirror-down state) in which the movable mirror 134 reflects an object light coming through the photo-taking lens 1 to a view finder optical system (not shown), as shown in FIGS. 2 and 7(a). The other is an exposure-allowing retracted position (or a mirror-up state) in which the movable mirror 134 is turned to allow the object light to come to the film, as shown in FIG. 7(b). A carrying frame 136 has the movable mirror 134 secured thereto and is provided with rotating shafts 136a which are formed at two side end parts of the carrying frame 136. The carrying frame 136 is thus movably carried within a mirror box by the shafts 136a. A mirror pin 138 is formed on one side of the carrying frame 136 and abuts on the other end part 132b of the above-stated mirror driving lever 132. Further, the carrying frame 136 is constantly receiving the urging force of a spring 140 which is exerted counterclockwise (in the direction of the mirror-down state). Therefore, when one end part 132a of the mirror driving lever 132 comes into sliding contact with the uprising cam face 128a of the mirror driving cam 128, the mirror driving lever 132 receives a counterclockwise turning force. The lever 132 then maintains its counterclockwise turning state when it is in sliding contact with the level cam face 128b of the cam 128, and is then allowed to resume its clockwise turning motion by coming into sliding contact with the descending cam face 128c. The other end part 132b of the mirror driving lever 132 acts, under the control of the turning positions of the mirror driving cam 128, to raise the movable mirror 134 by pushing the mirror pin 138, to retain the mirror 134 in the mirror-up state by continuously pushing the pin 138, and to allow the mirror 134 to be lowered by releasing the mirror pin 138 from the pushing action.

A shutter charge gear 142 is arranged to rotate counterclockwise by meshing with the above-stated mirror driving gear 126. A shutter charge cam 144 is formed on the obverse side of the gear 142 in one body with the gear 142. The shutter charge gear 142 and the mirror driving gear 126 are arranged to be in the transmission ratio of 1:1 to each other (reduction ratio: 1.0). The shutter charge cam 144 is provided with an uprising cam face 144a (see FIGS. 7(a), 7(b) and 7(c)) for driving a shutter charge lever 146 counterclockwise, a level cam face 144b for keeping the lever 146 in the turning position or a charging state (see FIGS. 7(a), 7(b) and 7(c)), and a descending cam face 144c (see FIGS. 7(a), 7(b) and 7(c)) for causing the lever 146 to turn clockwise.

The shutter charge lever 146 is about in an L shape. A center shaft 146a rotatably carries the shutter charge lever 146 to allow the lever 146 to follow the movement of the above-stated shutter charge cam 144. More specifically, the shutter charge lever 146 is provided with a roller 146b which is carried by one end part of the lever 146. The lever 146 is arranged to turn counterclockwise while the roller 146b is abutting on an uprising cam face 144a of the shutter charge cam 144, to keep on turning counterclockwise while the roller 146b is abutting on a level cam face 144b, and to be allowed to turn clockwise when the roller 146b reaches a descending cam face 144c of the cam 144. Another roller 146c which is carried by the working end of the shutter charge lever 146 is arranged to push one end of a charging lever disposed within a shutter unit under the control of the cam faces of the shutter charge cam 144. The charging lever is pushed to perform a shutter charging action and to continue the charging action. Under this condition, both the leading and trailing groups of shutter blades can be mechanically kept in their positions in which they are ready for traveling. The details of the shutter unit have already been disclosed in U.S. patent application Ser. No. 137,888 filed on Dec. 24, 1987 and, therefore, are omitted from the description given herein. The ready-for-travel states of the leading and trailing groups of shutter blades are canceled when the charging lever is released from the pushing action. After that, the shutter blades can be allowed to travel as desired under power supply control over electromagnets provided for shutter control.

Figure 7C:
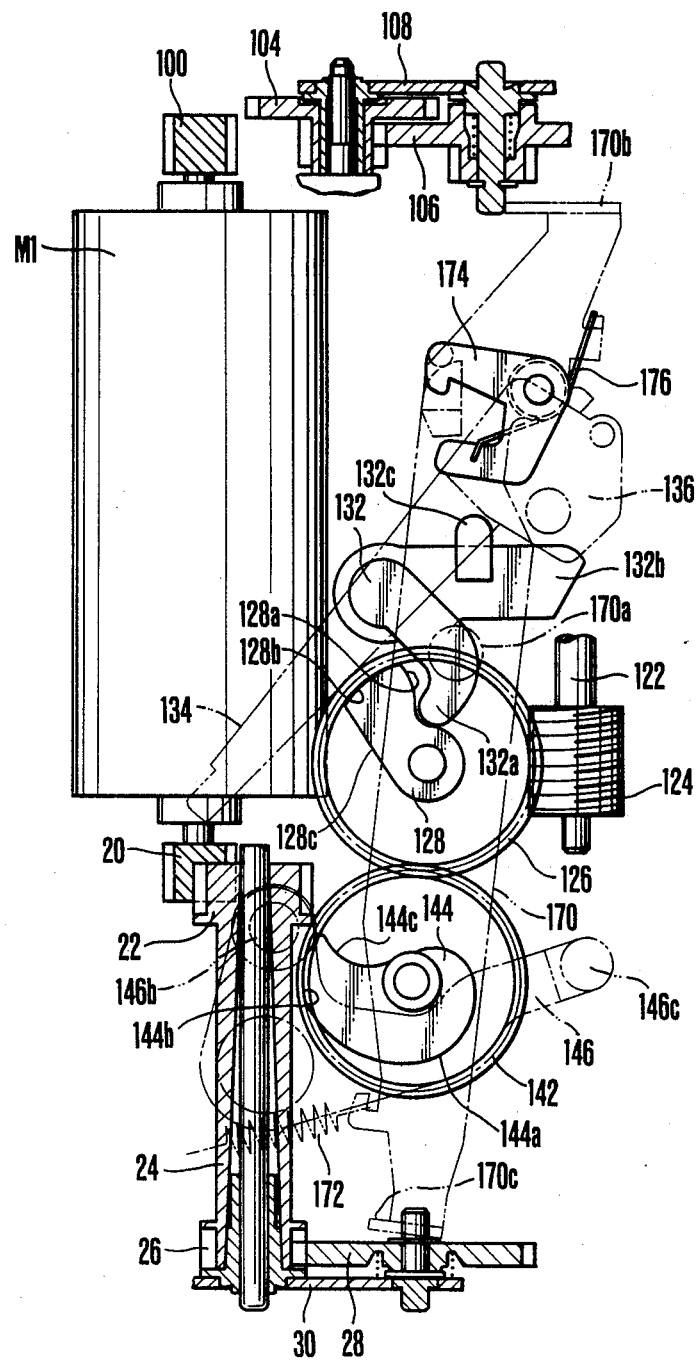

As will be readily understood by comparing FIGS. 7(b) and 7(c), the mirror-up driving phase of the mirror driving lever 132 which is brought about by the mirror driving cam 128 and the charge driving phase of the shutter charge lever 146 which is brought about by the shutter charge cam 144 are arranged to completely deviate from each other. In other words, when the shutter charge lever 146 is driven for charging by the shutter charge cam 144, the mirror driving cam 128 does not push the mirror driving lever 132 and the movable mirror 134 is left in the mirror-down state, as shown in FIG. 7(c). When the movable mirror 134 is raised with the mirror driving lever 132 pushed by the mirror driving cam 128, the shutter charge lever 146 is released from the shutter charging state by the shutter charge cam 144, as shown in FIG. 7(b). This cancels the mechanical holding (clamping) action on the ready-for-travel states of the leading and trailing groups of shutter blades.

Next, the details of a mechanism which is included in the embodiment for electrically detecting shutter charging and mirror-up driving phases are as described below with reference to FIGS. 8(a) and 8(b).

Figure 2:
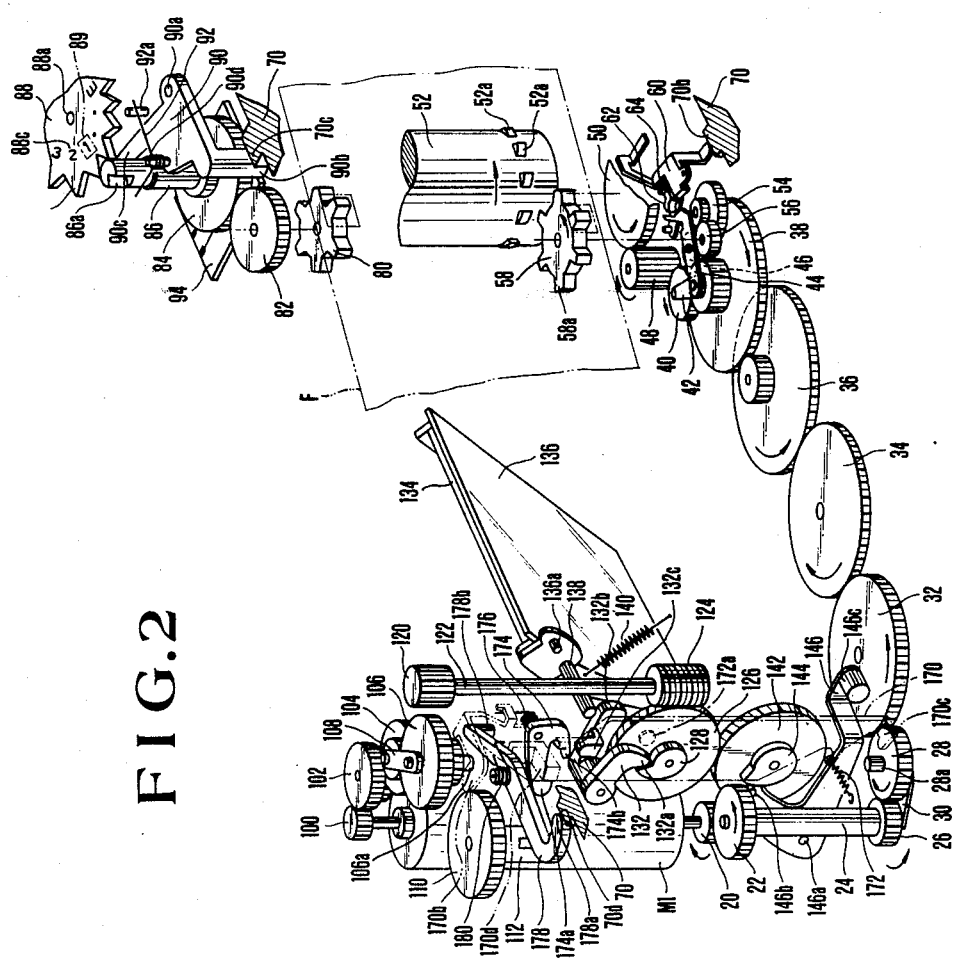
FIG. 2 is an oblique view showing the arrangement of each component part shown in FIG. 1.

A signal substrate 160 which is omitted from FIG. 2 for the sake of simplification of illustration is disposed on the reverse side of the mirror driving gear 126 in a position within the slidable range of a brush 130. On the signal substrate 160 are formed by vapor deposition or the like three position detecting patterns including a ground pattern 161, an action end detection pattern 162 and an overrun detection pattern 163. Referring to FIGS. 8(a) and 8(b), the relation of the brush 130 to these patterns 161, 162 and 163 is as described below:

The sliding part 130a of the brush 130 is divided into a comb shape for the purpose of increasing the safety of contact with the patterns 161 to 163 disposed on the signal substrate 160. The actual sliding position over this sliding part 130a, i.e. contact points, is on a line 130b which is located inwardly away from the tip of the brush 130.

Figure 8A:
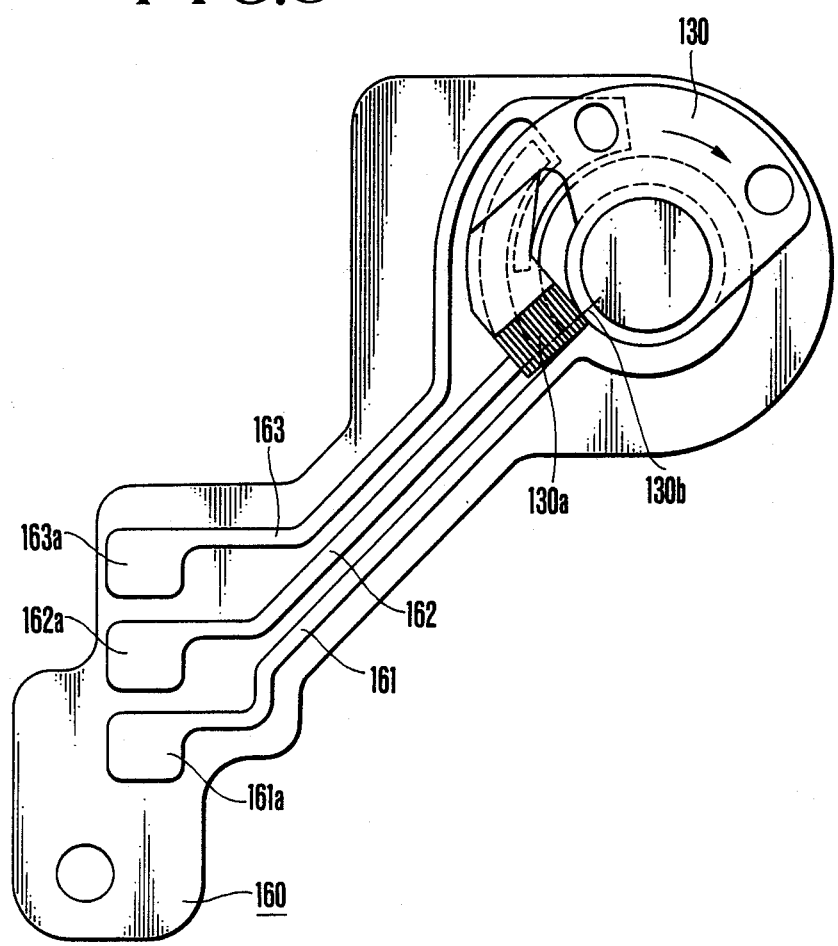
FIGS. 8(a) and 8(b) show the operation of a brush on a signal substrate, FIG. 8(a) showing a state in which the shutter charge has been completed (mirror-down state), and FIG. 8(b) showing a state in which the mirror has been raised (the shutter charge being cancelled).

FIG. 8(a) which corresponds to FIG. 7(c) shows the detecting mechanism in a phase in which completion of the shutter charging action is detected. The brush 130 turns clockwise as indicated by an arrow according to the clockwise rotation of the mirror driving gear 126. In the state shown in FIG. 8(a), the sliding part 130a of the brush 130 is in contact both with the ground pattern 161 and the action end detection pattern 162. The potential of a connector part (land part) 162a of the pattern 162 then changes to a ground level to permit detection of completion of the shutter charging action. Further details of this detecting action are as follows. A ground level signal is supplied to a connector part (land part) 161a of the ground pattern 161. The output of the connector part 162a of the action end detection pattern 162 is supplied to a control circuit of the camera. When the brush 130 is located in a position preceding the position shown in FIG. 8(a) (i.e. in a position preceding in the counterclockwise direction), the sliding part 130a of the brush 130 is in contact solely with the ground pattern 161 and the potential of the action end detection pattern 162 has not yet changed to the ground level. Then, the mirror driving gear 126 is further rotated clockwise to cause the clockwise turn of the brush 130. When reaching the position shown in FIG. 8(a), the brush 130 which is made of a conductive material comes into contact with the action end detection pattern 162, so that the potential of the pattern 162 is changed through the brush 130 to the ground level to allow the control circuit of the camera to detect completion of the shutter charging action. The control circuit then performs a control action to cause the driving rotation of the motor M1 to stop.

Figure 8B:
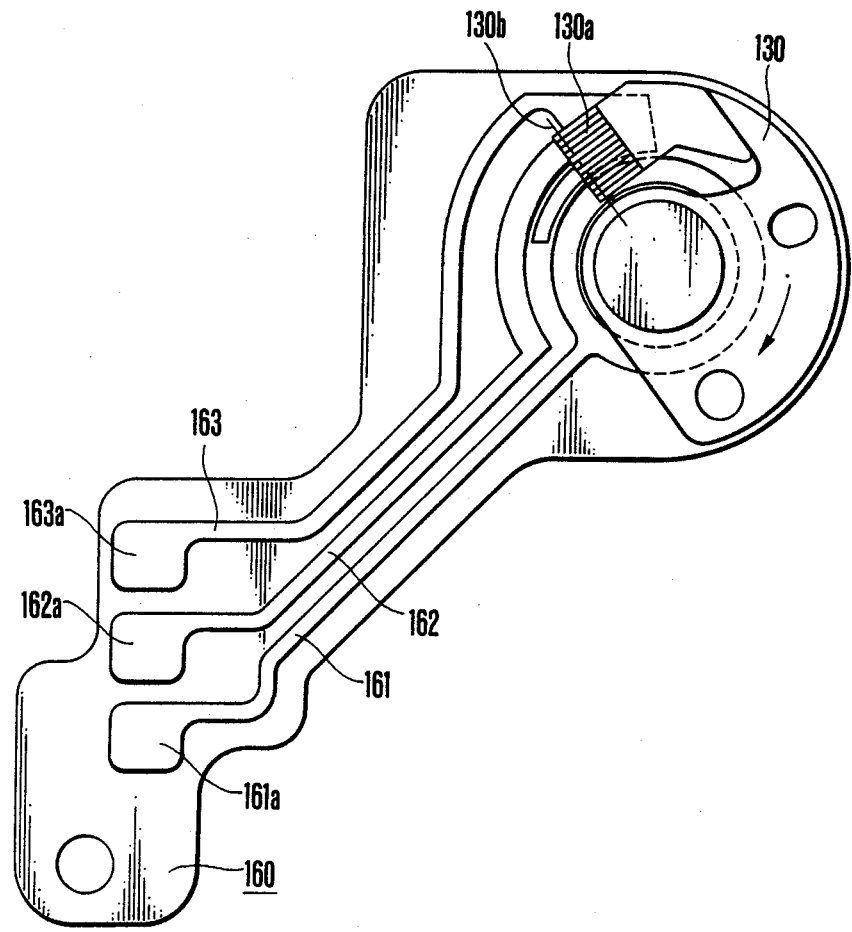

FIG. 8(b) which corresponds to FIG. 7(b) shows the detecting mechanism in another phase in which completion of the mirror-up action is detected. The brush 130 turns clockwise as indicated by an arrow from the position of FIG. 8(a) accordingly as the mirror driving gear 126 rotates clockwise. When the brush 130 thus reaches the position shown in FIG. 8(b), the sliding part 130a changes from a state in which it is in contact with both the ground pattern 161 and the action end detection pattern 162 to a state in which it is not in contact with the detection pattern 162. The connector part (land part) 162a of the detection pattern 162 then has its potential change from the ground level back to its initial level, which is normally a high level. This change permits detection of completion of the mirror-up action. Further details of this detection are as follows: When the brush 130 is located in a position preceding the position of FIG. 8(b) as viewed in the counterclockwise direction, the sliding part 130a of the brush 130 is in contact with both the ground pattern 161 and the action end detection pattern 162, and the connector part 162a of the action end detection pattern 162 is then still supplying the control circuit of the camera with the ground level signal. Then, the mirror driving gear 126 is further rotated clockwise under this condition to cause the brush 130 to turn also clockwise. When the brush 130 reaches the position of FIG. 8(b), the brush 130 changes to a state in which it is not in contact with the action end detection pattern 162. Then, the potential of the action end detection pattern 162 is changed from the ground level to its initial level to allow the camera control circuit to detect completion of the mirror-up action. The control circuit then controls and brings a rotatory driving action on the motor M1 to a stop.

Referring now mainly to FIGS. 2, 7(a), 7(b) and 7(c) the details of the change-over arrangement of the film winding and rewinding mechanism, the mirror driving mechanism and the shutter charging mechanism are as follows. For the sake of simplification of illustration, a change-over lever 170 is illustrated by a two-dot chain line. This change-over lever 170 is pivotally carried by a center shaft 170a to be swingable around the shaft 170a and is provided with a first restrictive projection 170b which is formed at the upper end part of the lever 170 and second restrictive projection 170c which is formed at the lower end part of the lever 170. A spring 172 is arranged to urge the changeover lever 170 to turn clockwise. A clamp lever 174 is swingably disposed on the change-over lever 170 and is provided with a latch claw 174a which is formed at one end of the lever 174 and a projection 174b which is formed at the other end of the lever 174. A spring 176 is arranged to urge the clamp lever 174 to turn counterclockwise. The spring 176 has one end thereof attached to the change-over lever 170 and the other end to the clamp lever 174. The latch claw 174a engages a clamping projection 170d formed on the change-over lever 170 in its initial state, as shown in FIGS. 2 and 7(a), and is kept in that engaging position by the urging force of the spring 176. Meanwhile, the projection 174b of the clamp lever 174 is located within the moving locus of a pushing projection 132c formed on the mirror driving lever 132. When the mirror driving lever 132 turns counterclockwise to raise the mirror 134, as shown in FIG. 7(b), the pushing projection 132c pushes the projection 174b to turn the clamp lever 174 clockwise in such a way as to relieve the clamp lever 174 from its clamping state. Under this condition, the change-over lever 170 is allowed to turn clockwise to some degree to come to the position of FIG. 7(b).

Figure 9A:
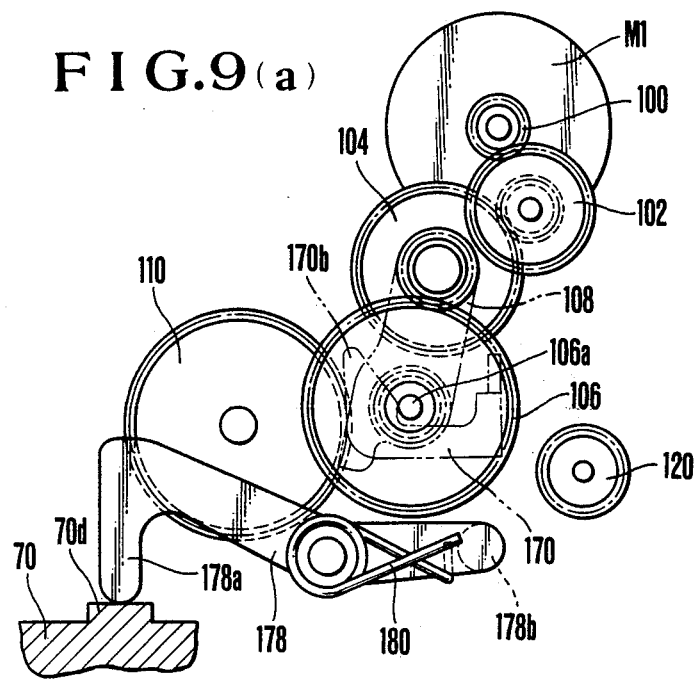
FIGS. 9(a), 9(b), 9(c) and 9(d) show the operation of the film rewind driving mechanism as viewed from above. Among these figures.
Figure 9B:
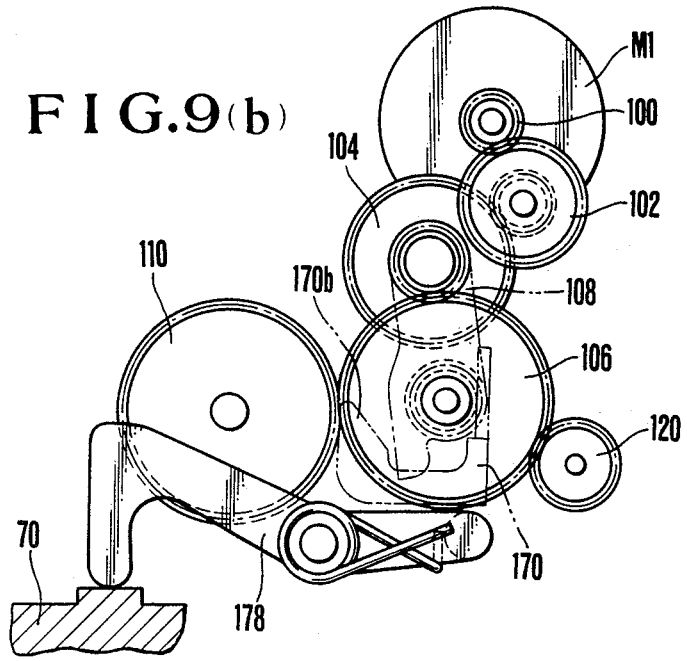
Figure 9C:
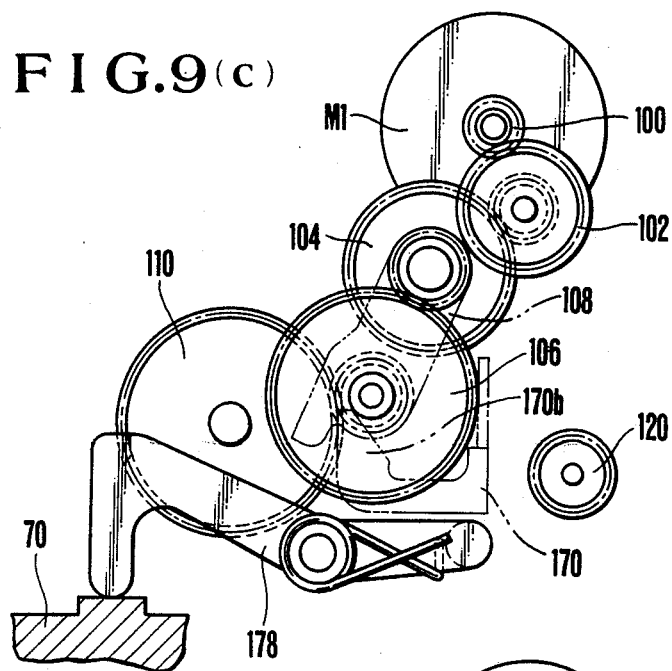
Figure 9D:
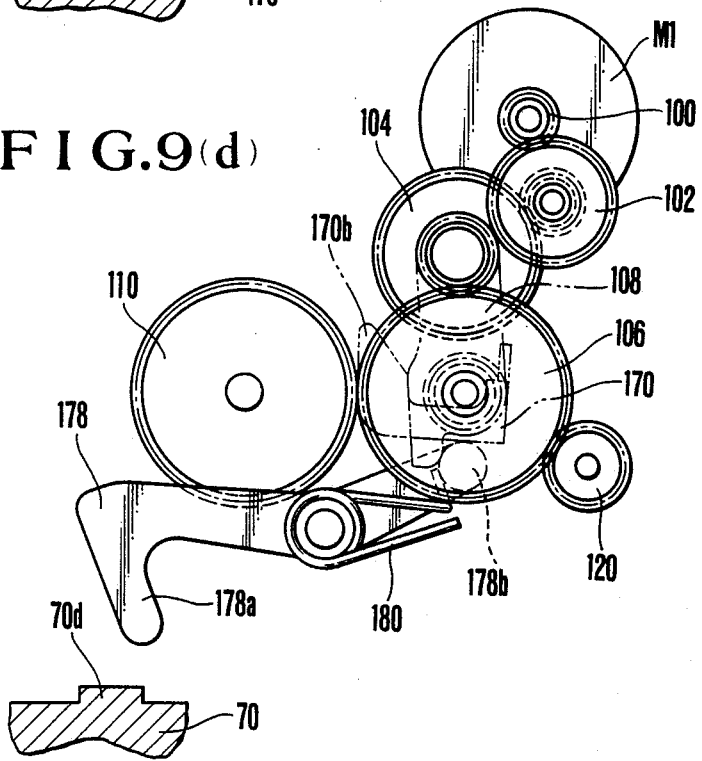

A reset lever 178 is swingably carried (see FIGS. 2 and 9(a) to 9(d)) and has a projection 178a formed at one end thereof and a pushing projection 178b at the other end. A strong spring 180 urges the reset lever 178 to turn counterclockwise and has a stronger spring force than the spring 172 which is exerting an urging force on the change-over lever 170. Therefore, when the black lid 70 is closed, the projection 70d of the back lid 70 pushes the projection 178a to keep the reset lever 178 in the state of FIGS. 2 and 9(a). This allows the change-over lever 170 to turn clockwise. However, when the back lid 70 is opened to relieve the reset lever 178 from the pushed state as shown in FIG. 9(d), the reset lever 178 turns counterclockwise to cause the change-over lever 170 which has turned clockwise by the spring 172 to turn counterclockwise against the force of the spring 172 until the lever 170 comes back to its initial position shown in FIG. 2. In returning the change-over lever 170 back to the initial position, the clamp lever 174 has its pin 174c guided by a guide projection 170e which has a cam face and which is formed on the reverse side of the change-over lever 170. The lever 174 is thus guided until the latch claw 174a comes to engage the clamping projection 170d. After that, the change-over lever 170 is kept in its initial position even when the rest lever 178 is caused to turn again with the back lid 70 closed.

The function of the change-over lever 170 is as described below with reference to the drawings including FIGS. 9(a) to 9(d) and 10(a) to 10(d).

Figure 10A:
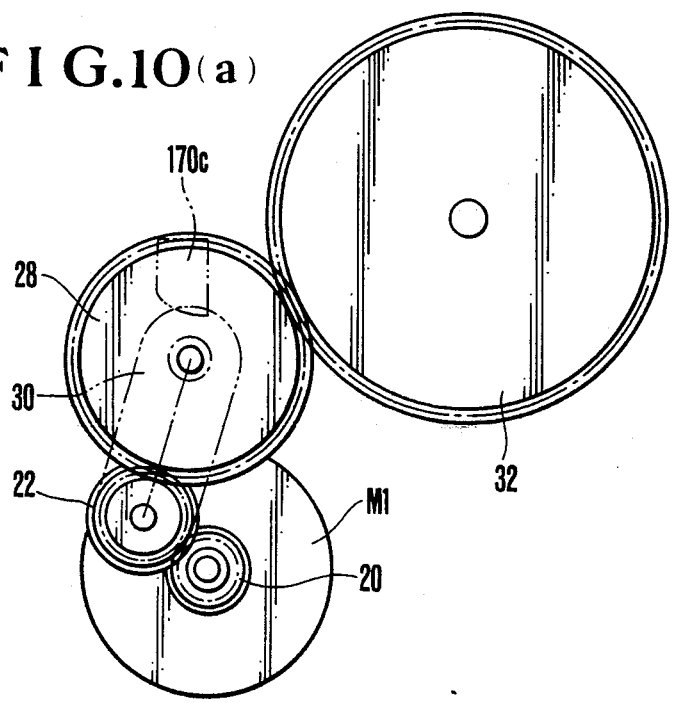
FIGS. 10(a), 10(b), 10(c) and 10(d) show the operation of the essential parts of the film wind driving mechanism disposed on the side of the motor as viewed from below. Among these figures.

While the change-over lever 170 is in the initial position as shown in FIGS. 2 and 7(a), the first restrictive projection 170b which is disposed at the upper end of the lever 170 is located in between the planet gear 106 and the rewinding gear 110, as shown in FIG. 9(a). Meanwhile, the second restrictive projection 170c which is disposed at the lower end of the lever 170 is located away from between the planet gear 28 and the transmission gear 32, as shown in FIG. 10(a). Under this condition, therefore, a film winding action can be performed by the clockwise rotation of the motor M1 as the planet gear 28 is allowed to be revolved in a direction in which it meshes with the transmission gear 32. However, no film rewinding action is allowed to be performed by the clockwise rotation of the motor M1 as the planet gear 106 is inhibited by the first restrictive projection 170b from revolving in a direction in which it meshes with the rewinding gear 110, as the center shaft 106a of the planet gear 106 comes to abut on the first restrictive projection 170b during its revolving movement. Meanwhile, the mirror driving and the shutter charging actions can be performed by the counterclockwise rotation of the motor M1 as the planet gear 106 is allowed to be revolved in a direction in which it meshes with the transmission gear 120 without being affected by the above-stated first restrictive projection 170b.

Figure 10B:
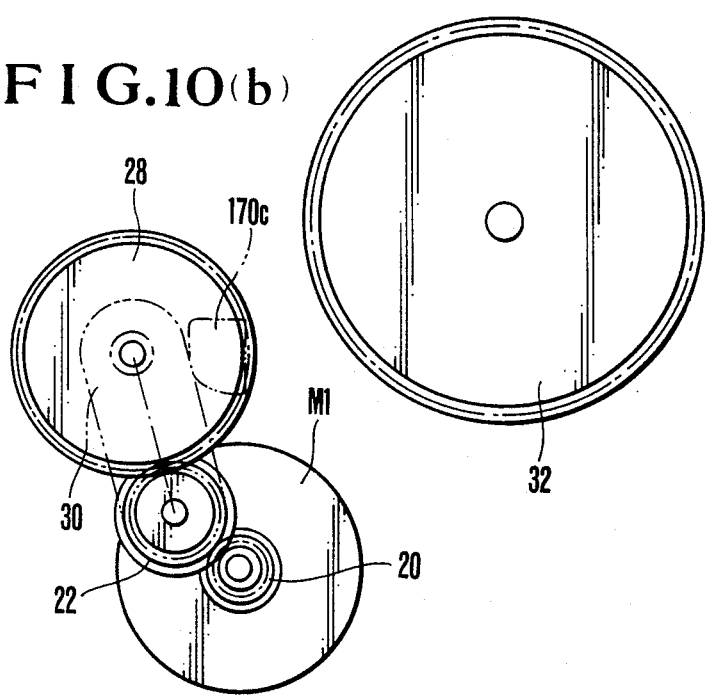
Figure 10C:
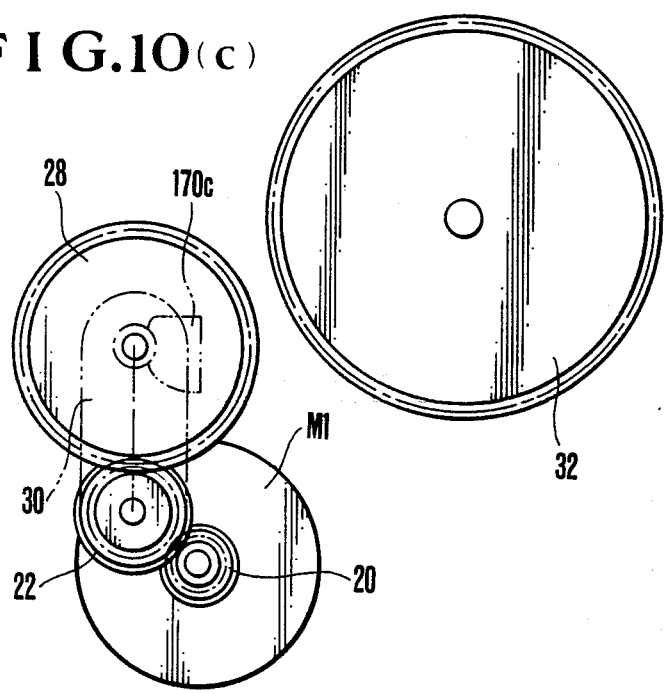

When the change-over lever 170 turns clockwise as shown in FIGS. 7(b) and 7(c), the first restrictive projection 170b of the upper end moves away from its position between the planet gear 106 and the rewinding gear 110, as shown in FIGS. 9(b) and 9(c). The second restrictive projection 170c of the lower end then enters between the planet gear 28 and the transmission gear 32, as shown in FIGS. 10(b) and 10(c). Under this condition, therefore, the planet gear 106 is allowed to be revolved in a direction in which it meshes with the rewinding gear 110 by the clockwise rotation of the motor M1, so that the film rewinding action can be accomplished. However, the planet gear 28 is inhibited by the second restrictive projection 170c from revolving in a direction in which it meshes with the transmission gear 32, as the center shaft 28a of the planet gear 28 comes to abut on the second restrictive projection 170c during the revolving movement, so that the film winding action cannot be accomplished under this condition. Further, even under this condition, the planet gear 106 and the transmission gear 120 can be revolved to mesh with each other by the counterclockwise rotation of the motor M1.

The camera control circuit will not be described with reference to FIG. 11. The illustration includes a microcomputer CPU; and a battery BAT. A power supply switch SW1 is turned on in response to the first stroke of a pushing operation on a shutter release button 2 (see FIG. 1). With the power supply switch SW1 turned on, a transistor $TR_{BAT}$ is turned on via a diode $D_{SW1}$ and a resistor R2. With the transistor $TR_{BAT}$ thus turned on, power supply to each applicable circuit begins. The output of the power supply switch SW1 is also supplied to an input port SW1 of the microcomputer CPU. When a back lid switch SWBP which will be described later is turned on (closed), a one-shot circuit OS comes to act for a given period of time. The transistor $TR_{BAT}$ is arranged to be turned on also by this action of the one-shot circuit OS via a diode $D_{OS}$ and the resistor R2. The arrangement for bringing the transistor $TR_{BAT}$ into an on-state by closing of the back lid 70 is provided for the purpose of effecting a power supply to the microcomputer CPU to enable the microcomputer CPU to perform the control over the so-called prewinding system including the film loading action and the operation of preliminarily winding all the frame portions of film. Further, if the microcomputer CPU is in an operative state having its output port $V_{ON}$ at a high level, the transistor $TR_{BAT}$ is kept in its on-state via an inverter I1 and the resistor R2.

Figure 11:
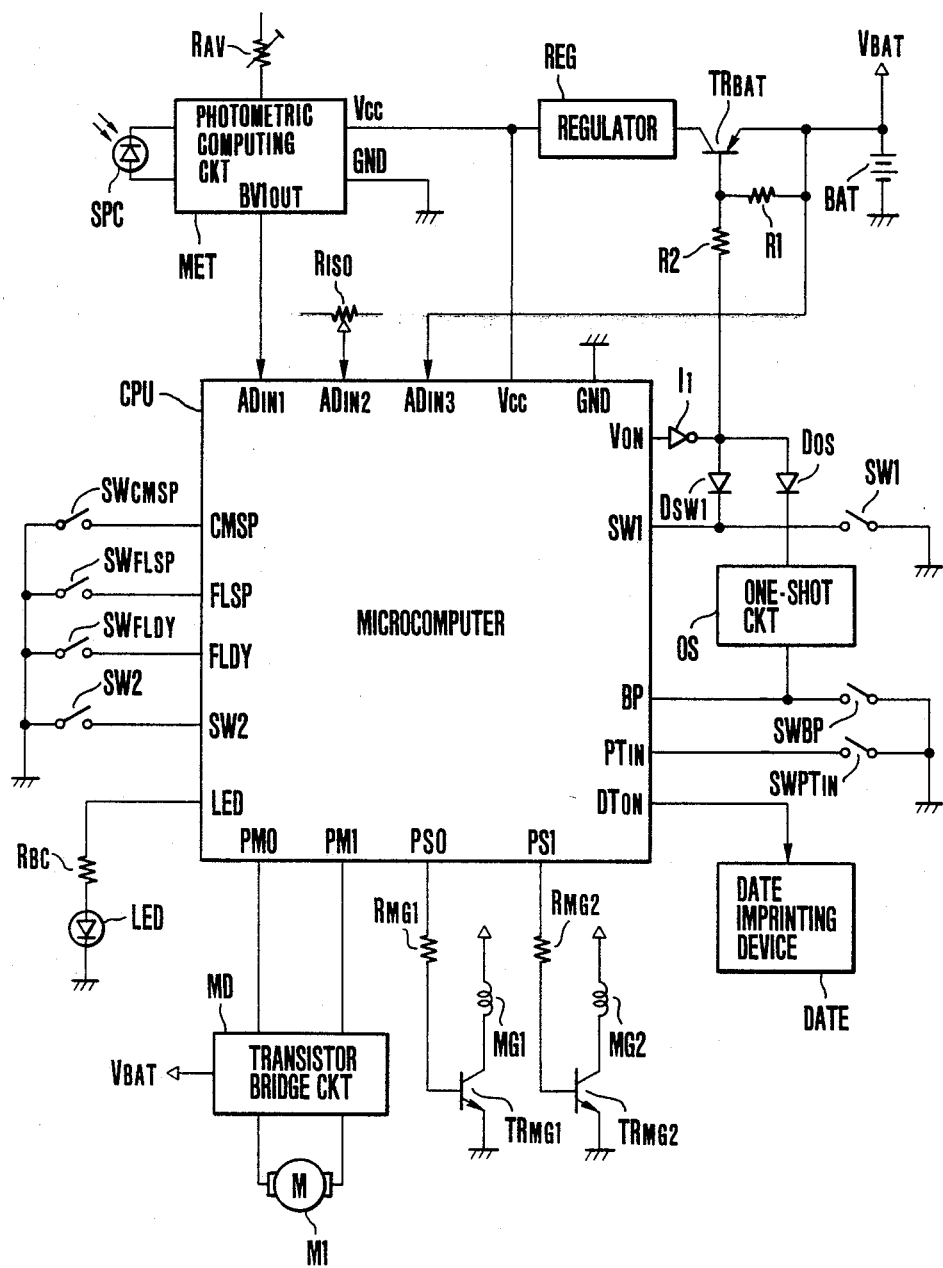
FIG. 11 is a circuit diagram showing essential parts participating in a control over the camera.

In FIG. 11, a reference symbol REG denotes a regulator. The regulator REG is arranged to supply a stable, constant voltage Vcc to each of circuits connected to the collector output terminal of the transistor $TR_{BAT}$. (In the case of FIG. 11, the constant voltage Vcc is supplied to the input port Vcc of the microcomputer CPU and to an analog circuit MET which is arranged to perform a photometric computing operation.) A reference symbol MET denotes the analog circuit which performs photometric computation. The circuit MET is arranged to perform a computing operation "Bv−Av" on an object luminance information Bv which is obtained by a photometric sensor SPC and a resistance $R_{AV}$ which corresponds to a preset aperture value information Av and to supply its output $BV1_{OUT}$ to an input port $AD_{IN1}$ of the microcomputer CPU. The input port $AD_{IN1}$ is arranged to receive an AD conversion input. A resistor $R_{ISO}$ has a resistance value corresponding to film sensitivity information Sv and is arranged to supply the information to an input port $AD_{IN2}$ of the microcomputer CPU. A reference symbol $V_{BAT}$ denotes the voltage of the battery BAT. The battery voltage $V_{BAT}$ is supplied to the input port $AD_{IN3}$ of the microcomputer CPU and a transistor bridge circuit MD which will be described later.

A film loading detection switch $SWPT_{IN}$ is composed of, for example, a leaf spring disposed within a film cartridge chamber of the camera. When the film cartridge is placed in the cartridge chamber, the leaf spring is pushed by the cartridge to turn on the switch $SWPT_{IN}$. The output of the switch $SWPT_{IN}$ is supplied to an input port $PT_{IN}$ of the microcomputer CPU.

A back lid switch SWBP is turned on when the back lid 70 (see FIG. 2) closes and is turned off when the back lid 70 opens. The output of the back lid switch SWBP is supplied to an input port BP of the microcomputer CPU and to the one-shot circuit OS. A switch $SW_{CMSP}$ is arranged to operate according to the sliding movement of the brush 130 over the action end detection pattern 162 on the signal substrate 160 (see FIG. 8). A point of time at which the output level of this switch $SW_{CMSP}$ changes from a low level to a high level represents a mirror-up (shutter-charge release) phase. Another point of time at which the output level of the switch $SW_{CMSP}$ changes from a high level to a low level represents a mirror-down (shutter charge) phase. The output of the switch $SW_{CMSP}$ is supplied to an input port CMSP of the microcomputer CPU.

Reference symbols $SW_{FLSP}$ and $SW_{FLDY}$ denote switches provided for detecting the rotation of the detection gear 84 (see FIGS. 2 and 4). The switch $SW_{FLSP}$ is arranged to produce an output which corresponds to the output of the terminal 95 of the detection substrate 94 (see FIG. 5) and to supply the output to an input port FLSP of the microcomputer CPU. The switch $SW_{FLDY}$ is arranged to produce an output which corresponds to the output of the terminal 97 and to supply the output to an input port FLDY of the microcomputer CPU.

A symbol SW2 denotes a release switch. The release switch SW2 is arranged to be turned on by the second stroke of the pushing operation performed on the shutter release button 2. The output of the switch SW2 is supplied to an input port SW2 of the microcomputer CPU.

A symbol LED denotes a warning light emitting diode. The diode LED is disposed either in the neighborhood of the view-finder field or on the outside of the camera and is connected via a resistor $R_{BC}$ to an output port LED of the microcomputer CPU. A symbol MD denotes a known transistor bridge circuit. The transistor bridge circuit MD is arranged to control the motor M1 (see FIG. 2) in accordance with the instruction of the microcomputer CPU and is connected to output ports PM0 and PM1 of the microcomputer CPU. A symbol MG1 denotes a magnet for the leading shutter blade group. The magnet MG1 is arranged to cause the leading shutter blade group to begin to travel. A current supply is effected to the magnet MG1 when a transistor $TR_{MG1}$ is turned on through a resistor $R_{MG1}$ by changing the output level of the output port PS0 of the microcomputer CPU to a high level. A symbol MG2 denotes a magnet for the trailing shutter blade group. The magnet MG2 is arranged to cause the trailing shutter blade group to begin to travel when a current supply is effected to the magnet MG2. More specifically, the current supply to the magnet MG2 is effected when a transistor $TR_{MG2}$ is turned on through a resistor $R_{MG2}$ by changing the output level of the output port PS1 of the microcomputer CPU to a high level.

A reference symbol DATE denotes a known date imprinting device, which is arranged to imprint such data as a date, a day of the week, etc. on the film surface from the side of the back lid 70. The imprinting action is performed when the level of an output port $DT_{ON}$ of the microcomputer CPU becomes high. Further, in FIG. 11, a symbol GND denotes the ground.

The operation of the camera control circuit is as described below with reference to FIGS. 12(a), 12(b), 13(a) and 13(b) which are flow charts.

(Prewinding)

Step S1: Upon receipt of power from a power supply, the microcomputer CPU executes a program beginning with a start address START. Step S2: The output level of the output port $V_{ON}$ of the microcomputer CPU is changed to a high level ($V_{ON}=1$) to keep the transistor $TR_{BAT}$ in an on-state for holding the power supply on. Step S3: The output of the film loading detection switch $SWPT_{IN}$ is checked to see if the camera is loaded with the film. If so, the flow of operation proceeds to a step S4. If not, the flow comes to a step S5. Step S4: The output of the back lid switch SWBP is checked to see if the back lid 70 is closed. If so, the flow comes to a step S7. If not, the flow comes to a step S50 which is a release routine. Step S5: The back lid switch SWBP is checked in the same manner as in the step S4. If the back lid 70 is found to be closed, the flow proceeds to a step S6. If not, the flow comes to the release routine of the step S50. Step S6: An EFPROM (a non-volatile memory) is disposed within the microcomputer CPU. One of the bits of the EFPROM is employed as an EFP flag. This flag is set at "1". Although it will be described in further detail later on, the EFP flag is used for making a decision when the back lid 70 is closed as to whether or not the prewinding action is to be carried out. After the EFP flag is set at "1", the flow comes to the release routine of the step S50.

Step S7: If the EFP flag is at "1" (EFP=1), the flow proceeds to a step S8. If it is found to be in its initial state (EFP=0), the flow comes to the release routine of the step S50. Step S8: The voltage $V_{BAT}$ of the battery BAT is checked on the basis of the analog input obtained at the input port $AD_{IN3}$ (an AD conversion input). The voltage $V_{BAT}$ is AD-converted by an AD converter which is disposed within the microcomputer CPU. If the voltage $V_{BAT}$ is found to be lower than a predetermined voltage level, the flow proceeds to a step S9 because of the probability of some faulty action. If the voltage is found to be above the predetermined level and thus indicates no problem in terms of power supply, the flow proceeds to a step S10. Step 9: The output level of the output port LED is changed to a high level to instruct the warning light emitting diode LED to light up for indicating that the camera cannot be operated due to the dropped state of the battery voltage $V_{BAT}$. This instruction includes a function of causing the light emitting diode LED to automatically extinguish its light by changing the output level of the output port LED to a low level after the lapse of a given period of time. The flow then comes to a step S47 which is a stop routine.

Step S47: All the sequences of processes ultimately come to this routine without fail. The level of the output port $V_{ON}$ is set at a low level ($V_{ON}=0$). This causes the transistor $TR_{BAT}$ to be turned off and renders the regulator REG inoperative to turn off the power supply to the circuit system. Further, there is a waiting period of time. The power supply Vcc is normally turned off while the microcomputer CPU is in the waiting state. The power supply Vcc sometimes still remains on even when this waiting time has expired. Such occasions arise when the transistor $TR_{BAT}$ is kept on due to some reason other than for the output of the output port $V_{ON}$. In other words, on such occasions, the one-shot circuit OS is operating with the power supply switch SW1 or the back lid switch SWBP is turned on. Under that condition, the flow comes back to the step S1 which is a start address for execution of a new sequence of processes.

Step S10: When the camera is loaded with a film, the back lid 70 is closed, the flag EFP is at "1" and, further, the battery voltage $V_{BAT}$ is at a level sufficiently high for operation, the camera performs the prewinding action in the following manner.

The motor M1 is caused to rotate in the normal direction (clockwise as viewed on FIG. 2) to drive the driving sprocket 58 and the spool 52. The leader part of the film is first taken up onto the spool 52. After that, all the frame portions of the film are wound onto the spool 52 before photographing. The microcomputer CPU then controls the operation of the motor M1 as follows:

|  | PM0 | PM1 |
| --- | --- | --- |
| Normal rotation: | H (high) | L (low) |
| Reverse rotation: | L | H |
| Brake: | H | H |

Further, a timer TMR is reset to its initial state (TMR=0). The timer TMR is provided for detection of any condition that does not permit correct film loading and a stretched condition of the film obtained after completion of prewinding all the frame portions of the film. In the event of these conditions, the film becomes immovable. Then, either of these two conditions can be considered to have occurred, if the film is found to have not been moved to a predetermined amount within a period of time set at the timer TMR. Meanwhile, registers VR and VNR which are provided for battery voltage check are reset to their initial states (VR=0 and VNR=0). Further, the register ECOUNT of the EFPROM (non-volatile memory) which is disposed within the microcomputer CPU is also reset to its initial state (ECOUNT=0). The register ECOUNT is employed as an electric film counter.

Step S11: The state of the back lid switch SWBP is checked to see if the back lid 70 is opened during the process of prewinding. If the back lid 70 is found to have been opened, the flow proceeds to a step S12. If not, the flow comes to a step S13. Step S12: With the back lid 70 opened during the prewinding process, the rotation of the motor M1 is stopped to bring the prewinding action to a stop and the flow comes to the stop routine of the step S47. Further, if the back lid 70 is again closed, the flow of program proceeds from the start step S1 to carry out the prewinding action as the flag EFP then has not been reset and still remains at "1". In this instance, however, any photographing operation on a film portion currently taken up by the prewinding action up to the time of the release routine of a step S50 which will be described later can be automatically inhibited as the register ECOUNT is reset to "0".

Step S13: The input port FLSP of the microcomputer CPU is checked to see if the film has been moved by the prewinding action. If any change is found in the signal supplied to the input port FLSP, the flow proceeds to a step S14. If not, the flow comes to a step 22. Step S14: With the film found to have moved through the change in the signal supplied to the input port FLSP, the film stop detecting timer TMR is reset to its initial state (TMR=0). Step S15: The content of the register VR is added to a value $AD_{IN3}$ which is obtained by digital conversion of the analog voltage of the battery voltage detecting input port $AD_{IN3}$ by the AD converter disposed within the microcomputer CPU. The result of this addition is again stored by the register VR(VR=VR+$AD_{IN3}$). Since the register VR has been reset to its initial state at the step S10, the voltage value is incremented every time the signal supplied to the input port FLSP changes and the result of addition is again stored at the register VR. Further, the content of a register VNR is incremented by "1" (INC VNR). The number of times for which the voltage value is added to register VR is thus shown by the register VNR.

Step S16: A check is made for the state of the input port FLDY. If the input port FLDY is receiving a high level signal, i.e. if the brush 85 is located in any area other than the brake control section and the duty control section, the flow comes back to the step S11. If the signal supplied to the input port FLDY is found to be at a low level, thus indicating that the brush 85 is within the brake control section or the duty control section, the flow proceeds to a step S17.

Further, in the time chart of FIG. 6, the time is assumed to be lapsing in the direction from the right to the left during the prewinding process.

Step S17: The level of the signal supplied to the input port FLSP of the microcomputer CPU is checked for a discrimination between a high level and a low level. If it is at a high level, the flow proceeds to a step S18. If not, the flow comes to a step S19.

Referring again to the time chart of FIG. 6, a signal indicative of the prewinding process changes with the lapse of time, from the right-hand side to the left-hand side. When, for example, this process reaches a point on the right side of the brake control section, the flow proceeds in the order of the steps S13, S14, S15, S16, S17 and S19.

Step S18: When the brush 85 enters the duty control section from the brake control section, the level of the signal supplied to the input port FLSP changes from a low level to a high level. Under this condition, the content of the register ECOUNT which serves as an electric film counter is incremented by one. After that, the flow comes back to the step S11. In other words, the number of the frame portions of film is counted independently of the mechanical counter (the counter gear 88) by incrementing the content of the register ECOUNT at a point of time when the brush 85 shifts its position from the brake control section to the duty control section during the process of the prewinding.

Step S19: An average value V of voltage values obtained at the step S15 is computed (V=VR/VNR). More specifically, the values of the power supply voltage which has been obtained by computation (VR=VR+$AD_{IN3}$) every time the signal supplied to the input port FLSP changes before the brush 85 enters the brake control section are averaged. When the battery voltage $V_{BAT}$ is found through this process to be no longer usable, the driving operation of the motor M1 is suspended at the ensuing step. Further, the averaging operation of the step S19 is performed for the purpose of canceling any power supply noise that might occur during the driving operation of the motor M1.

Step S20: A check is made to see if the voltage V obtained at the step S19 is higher than a predetermined value M. If the voltage V is found to be higher than the value M and is not giving any problem for the operation of the camera, the flow comes back to the step S11. If the voltage V is found lower than the value M and the battery BAT is thus considered to be not usable, the flow proceeds to a step 21. Further, the influence of the power supply noise is salient in the initial stage of the prewinding action. However, this presents no problem, because the flow is arranged to automatically come back to the step S11 if the content of the register VNR is not greater than a predetermined value. Step S21: The prewinding action is brought to a stop by stopping the rotation of the motor M1. The warning light emitting diode LED is allowed to light up. After that, the flow proceeds to the stop routine In this instance, if the power supply voltage is raised or if the battery is replaced with a new battery, the prewinding action is resumed as the content of the EFPROM still retains in its stored state.

Step S22: With the signal supplied to the input port FLSP having been found to have no change at the step 13, the timer TMR is checked to see if the counted value of the timer TMR has reached a predetermined value K. If not, the flow comes back to the step 11 to repeat the routine of the steps S11, S13 and S22. Meanwhile, in a case where the above-stated signal supplied to the port FLSP still remains unchanged even after the value of the timer TMR reaches the predetermined value K, the flow proceeds to a step S23. Step S23: With a discriminating value set at "3", when the value of the register ECOUNT which is employed as the electric film counter is found to be greater than "3", thus indicating a normal state, the flow proceeds to a step S24. If the value is found to be not greater than "3", film loading on the spool 52 is regarded as a failure. In that event, the flow comes to a step S12 to bring the rotation of the motor M1 to a stop.

When the film is loaded on the spool 52 by the prewinding action, all the frame portions of the film are taken up. The film then presents itself in a stretched state. Under this condition, the flow proceeds from the step S22 to a routine of branching out to the step S23. The film does not move also in the event of in apposite film loading which prevents the film from being taken up onto the spool in the initial stage of the prewinding action. In that event, the flow also proceeds to the routine of proceeding to the step S23 in the same manner as in the case of the above-stated stretched state of film. At the step S23, therefore, a discrimination is made between the above-stated different cases. More specifically, the film is considered to have become immovable due to the stretched state if the content of the register ECOUNT is larger than "3" (a normal state), or due to the inapposite film loading on the spool 52 if the content of the register ECONT is "3" or less (an abnormal state).

In a case where the rotation of the motor M1 comes to a stop with the flow coming to the step S12 due to the impossibility of film loading, the mechanical film counter enables the photographer to know the abnormal state and to try again to load the camera with the film.

Step S24: The flag EFP which is used as a flag for deciding whether or not the prewinding action is to be performed again is reset (EFP=0). Therefore, in the ensuing sequence of processes, the flow branches from the step S7 to a step S50 and does not come to the above-stated routine of the prewinding action. Step S25: Since the prewinding action has been normally carried out, the prewinding action is brought to a stop by stopping the motor M1. Step S26: The phase of the counter gear 88 serving as the mechanical film counter and that of the register ECOUNT serving as the electric film counter are adjusted to each other by carrying out an adding or subtracting operation at a shifting point of the brush 85 between the brake control section and the duty control section In a case where the brush 85 has moved to a slight extent into the duty control section after coming from the brake control section at the point in time when the prewinding action comes to an end, the embodiment operates as follows: In this instance, the counted values of the mechanical and electrical film counters are normally incremented by one at the above-stated shifting point, respectively. Sometimes, however, the tension of the film moves the film a little backward, i.e. toward the film cartridge, to cause thereby the follower sprocket 80 to rotate to a small degree in the film rewinding direction when the driving action of the motor M1 comes to a stop (when a current supply to the motor is cut off). The brush 85 then might come back into the brake control section As a result, the register ECOUNT serving as the electric film counter might fail to detect the backward movement while the counter gear 88 serving as the mechanical counter is moved to an extent of one frame in the film rewinding direction (decremented by one). In that event, the counted values of these two counters come to differ by one from each other. If this count error is left uncorrected during photographing which is performed by rewinding the film, the photographing operation would be performed including a portion of film which has already been exposed to light during the prewinding action.

To solve this problem, therefore, steps S26 to S30 are provided for adjusting the value of the register ECOUNT to the counter gear 88 in the last stage of the prewinding action.

Step S26: The signal supplied to the input port FLDY is checked for its level. If the signal level is found to be low, the flow proceeds to the step S27. If it is high, the flow comes to a step 31. Step S27: The signal supplied to the input port FLSP is checked. If the level of the signal is found to be high, the flow proceeds to the step S28. If it is found to be low, the flow comes to the step S31. Step S28: A waiting time is provided. The time is arranged to be sufficiently long for allowing the film to be moved back toward the film cartridge by the film tension. Step S29: After the lapse of the waiting time of the step S28, the state of the signal supplied to the input port FLSP is again checked. If the signal is still at a high level, the flow comes to the step S31. If the signal is found to have changed to a low level indicating thereby the occurrence of the above-stated phenomenon (the state of having the mechanical counter rotated to a degree corresponding to one frame by the film tension). the flow proceeds to the step S30. Step S30: The value of the register ECOUNT serving as the electric film counter is decremented (or subtracted) by one to adjust it to the value of the mechanical film counter.

Step S31: The motor M1 is caused to rotate in the reverse direction. The reverse rotation (counterclockwise rotation as viewed on FIG. 2) of the motor M1 causes the planet gear 106 to mesh with the transmission gear 120 of the mirror-driving and charge-driving system. This causes the mirror driving gear 126 and the shutter charge gear 142 to rotate. The clamp lever 170 is thus released from an initial position holding state and is allowed to swing to the position of FIG. 7(c). Accordingly, the output of the motor M1 will be transmitted only to the film rewinding system when the motor M1 is rotated again in the normal direction. Step S32: The state of a signal supplied to the input port CMSP is checked. When the level of this signal changes from its initial low level to a high level, the flow proceeds to a step S33.

Step S33: When the level of the signal supplied to the input port CMSP changes back to a low level with the motor M1 allowed to continue rotating in the reverse direction, the flow proceeds to a step S34. Step S34: The rotation of the motor M1 is temporarily brought to a stop. This step is provided for finding if a blank charging process which takes place according to the reverse rotation of the motor M1 at the preceding steps S32 and S33 has come to an end. A phase obtained at the point where the signal supplied to the input port CMSP changes from a low level to a high level indicates the mirror-up action and the cancellation of the shutter charging action. Another phase obtained at the point where this signal changes from a high level to a low level indicates the mirror-up action and the shutter charging action. Therefore, when the flow comes to the step S34 through the steps S32 and S33, the blank charging process has been performed once.

Next, the motor M1 is again allowed to rotate in the normal direction. This time the output of the motor M1 is transmitted to the film rewinding system as the change-over lever 170 has swung. In other words, the planet gear 106 meshes with the rewinding gear 110 to allow the rewinding gear 110 to be driven by the motor M1.

Step S35: The content of a register PCOUNT is reset to its initial value (PCOUNT=0). Step S36: The state of the signal supplied to the input port FLSP is checked to find the position of the brush 85 in the initial stage of film rewinding. If the brush 85 is within the brake control section, the signal is at a low level and the flow comes to a step S40. If the brush is in any section other than the brake control section, the signal is at a high level and then the flow proceeds to a step S37. Step S37: A check is made for the position of the brush 85 by checking also the state of the signal supplied to the input port FLDY. If the signal is found to be at a high level (indicating that the brush 85 is not within the brake and duty control sections), the flow comes to the step S40. If the signal is found to be at a low level (indicating that the brush 85 is within the duty control section in conjunction with the result of the check made at the step S36). the flow proceeds to a step S38. Step S38: Since the brush 85 has been determined to be within the duty control section in the initial stage of film rewinding, the counted value of the register ECOUNT which serves as an electric counter is decremented by one. Further, in the time chart of FIG. 6, the lapse of time is assumed to progress from the left to the right in the case of film rewinding.

Step S39: The flow waits until the level of the signal supplied to the input port FLDY becomes high thus indicating that the brush 85 is in any section other than the duty and brake control sections After that, the flow proceeds to the step S40.

Step S40: The input port FLSP is checked. If any change occurs in the signal supplied to the input port FLSP, the flow proceeds to a step S41. If not, the flow comes to a step S42. Step S41: The value of the register PCOUNT is incremented by one and the flow comes back to the step S40. Step S42: The input port FLDY is checked. If the signal supplied to the input port FLDY is found to be at a high level, the flow comes back to the step S40. If the signal is found to be at a low level, the flow proceeds to a step S43. The steps S40 to S42 are provided for the purpose of storing information on the number of signals which are obtained from the comb-shaped pattern 94a shown in FIG. 5 and which are supplied to the input port FLSP while the signal level of the input port FLDY remains high.

Step S43: The value of the register PCOUNT is compared with a predetermined value M. If the value is found to be smaller than the predetermined value M, the flow comes back to the step S35. If the value is found to be not smaller than the predetermined value M, the flow proceeds to a step S44.

In the case of the routine of this embodiment, the film is rewound to some extent upon completion of the prewinding action for the purpose of phase-adjusting the exposing frame portion of film to the rotating position of the follower sprocket 80 (i.e. the rotating position of the brush 85). However, if the rewinding amount is too small, a film cutting position might come within an exposed (photographed) frame in cutting the film off from the film cartridge during a film developing process. The step S43 is, therefore, provided for rewinding the film to a sufficient extent to avoid occurrence of such a problem. More specifically, the film rewinding extent from an initial state to a point where the brush 85 comes to the duty control section is judged from the number of teeth of the comb-shaped pattern 94a which have actually come into sliding contact with the brush 85. In a case where this number is smaller than the predetermined value M, the film rewinding amount is considered to be too small. In that event, actual photographing is not allowed until the film is further rewound to the extent of another frame.

Step S44: The motor M1 is duty-controlled before the brake control section for the purpose of making constant the overrun which takes place before the motor M1 actually comes to a stop after commencement of brake control. The method for the duty control over the motor M1 is well known and therefore requires no detailed description. Briefly stated, however, this control is performed for brake application to the motor M1 by supplying a current to the motor in an alternating pulse-like manner instead of effecting a full current supply to the motor to lower the effective voltage.

Step S45: The duty control is performed over the motor M1 while the brush 85 is moving within the duty control section. When it is found through the change to a low level of the signal supplied to the input port FLSP that the brush 85 has entered the brake control section, the flow proceeds to a step S46. Step S46: Braking control is applied to the motor M1. Then, the value of the register ECOUNT is decremented by one ("1" is subtracted).

The camera is completely readied by the above-stated routine for photographing. The flow, therefore, comes to the stop routine.

(Photographing)

Step S50: This is a release routine after the prewinding control process. Step S51: A digital value $AD_{IN1}$ which has obtained by AD (analog-to-digital) converting, at the microcomputer CPU, an analog signal supplied from the output terminal $BV1_{OUT}$ of the photometric computing circuit MET is stored by the register BV1 ($BV1 = AD_{IN1}$) This is a value "BV−AV" in terms of the APEX system. A digital value ADIN2 which has been obtained also by AD converting a film sensitivity value is stored by a register SV ($SV = AD_{IN2}$). The value $AD_{IN2}$ is a value "SV" in terms of the APEX system. Further, a shutter speed value is obtained from the data stored by the above-stated registers BV1 and SV (TV=BV1+SV). The shutter speed value thus obtained is stored by a register TV. The content of the register TV is a value "TV" in the APEX system.

Step S52: A check is made for the state of the release switch SW2 which is arranged to be turned on by the second stroke of a pushing operation on the shutter release button 2. The flow proceeds to a step S53 only when the switch SW2 is turned on. Step S53: Similar to the case of the step S8, the voltage $V_{BAT}$ of the battery BAT is checked. If the battery voltage is found to be a predetermined value or less, the flow proceeds to a step S54. If it is greater than the predetermined value, the flow comes to a step S55. Step S54: The output level of the output port LED is made to be high to light up the warning light emitting diode LED. This indicates that the camera is unable to operate due to the drop of the battery voltage. Step S55: The motor M1 is rotated in the reverse direction to perform the mirror-up action and the cancellation of the shutter charging action.

Step S56: The motor M1 is rotated in the reverse direction until a high level signal is supplied to the input port CMSP before the flow proceeds to a next step S57. The mirror driving gear 126 and the shutter charging gear 142 are driven. The movable mirror 134 is raised to be retracted from the optical path for an exposure. The shutter charging state of the camera is canceled to render the shutter operable. Step S57: The brake control is performed to bring the rotation of the motor 1 to a stop. Step S58: The APEX value TV is converted into an actual shutter speed (expansion to an actual time value). Step S59: The output level of the output port $DT_{ON}$ is made to be high to cause the date imprinting device DATE to begin to imprint data on the film surface.

The date imprinting device DATE is arranged in a known manner and does not require detailed description. Briefly stated, however, the device DATE is arranged as follows For example, a plurality of LCD segments which are shaped into the Chinese character " " are laterally aligned on the back lid side in a position confronting the film surface. The light transmitting parts of these segments are selected to form figures and characters indicative of a date, time, etc. by exposing the film surface to a transmission light thus obtained.

A timer DTMR which is provided for counting an imprinting period of time is started. The content of the timer DTMR depends on the content of the register SV. However, since the value SV of the content of the register SV is in the APEX system, the value of the content of the timer DTMR is a value "$\alpha \times 2^{\beta - SV}$" (wherein $\alpha$ and $\beta$ are constants) which is obtained by converting the APEX value SV into an actual time value.

Further, the timer interruption of the timer DTMR is allowed to take place at the step S59 (EN I). After expiration of the time of the timer DTMR, an interruption is allowed independently of the program of the main routine. By the interrupt routine, an imprinting action is accomplished by executing the following processes:

DT$_{ON}$=0: The output port DT$_{ON}$ is changed to a low level.

DTMR.STOP: The timer DTMR is stopped.

RTN: The flow comes back to the main routine.

Step S60: The output level of the output port PS0 is changed to a high level to effect a current supply to the magnet MG1 for causing the leading group of shutter blades to begin to travel. The leading group of shutter blades then travels and an exposure begins Further, the actual time of the shutter speed value obtained at the step S58 is actually counted. The time value thus obtained is used as exposure time. Upon completion of the actual time counting action, the output level of the output port PS1 is changed to a high level to effect thereby a current supply to the magnet MG2 for causing the trailing group of shutter blades to begin to travel. The trailing group of shutter blades then travels to bring the exposure to a stop.

Step S61: The flow waits for a period of time required for the travel of the trailing group of shutter blades. Step S62: The output levels of the two output ports PS0 and PS1 are changed to low levels to bring the current supply to the magnet MG1 and MG2 to a stop. Step S63: The motor M1 is rotated in the reverse direction to lower the mirror and charge the shutter.

Step S64: The motor M1 is rotated in the reverse direction until a low level signal is obtained at the input port CMSP. After that, the flow proceeds to a step S65. Meanwhile, with the motor M1 rotated in the reverse direction, the mirror driving gear 126 and the shutter charge gear 142 are driven once again. As a result, the movable mirror 134 is lowered (to permit sighting at the view finder), and the shutter is charged. Step S65: The brake control is performed to bring the motor M1 to a stop. Further, even if the output of the output port DT$_{ON}$ is at a high level (thus indicating that the time of the timer DTMR has not been expired), the date imprinting action is brought to an end by forcedly changing the output level of the output port DT$_{ON}$ to a low level (DT$_{ON}$=0). The reason for this is as follows: In the event of an extremely low degree of film sensitivity, the imprinting action might not be completed within the charging period of time. However, in the meantime, film rewinding would be performed at a next step for photographing on a next frame. If, despite of this, the date imprinting action is allowed to continue, the imprint of figures and characters would be flown. Should the imprinting action still continue even after completion of the charging action at the step S65, therefore, the imprinting action is forcedly stopped to prevent thereby the imprinted figures and characters from being flown. Further, the interruption is disabled and any interruption is inhibited thereafter (DIS I).

Step S67: After waiting for a standard period of time required for rewinding one frame portion of film, the flow comes to the stop routine. This step is provided for the following reason: If the camera is arranged to perform no film rewinding action when the camera is not loaded with a roll of film, a frame transport speed obtained when the user tries a continuous shooting operation on the camera at a camera shop would be too fast as compared with a speed obtainable for actual photographing to be performed with the camera loaded with the film. This would mislead the user about the specifications of the camera. This, however, can be prevented by the step S67.

Step S68: The motor M1 is rotated in the normal direction to rewind the film for photographing on a next frame. Step S69: Before proceeding to a step S70, the flow waits until the level of the signal supplied to the input port FLDY becomes high because: Since the motor M1 begins to rotate in the normal direction while the brush 85 is at a phase within the brake control section, the flow is arranged to wait until the brush 85 moves away from that phase. Step S70: Before proceeding to a step S71, the flow waits until the signal level obtained at the input port FLDY becomes low. In other words, the flow waits until the brush 85 enters the duty control section. Step S71: The duty control is performed over the motor M1. Step S72: Before proceeding to a step S73, the flow waits until the level of the signal supplied to the input port FLSP becomes high. In other words, the flow waits until the brush 85 enters the brake control section.

Step S73: Since the brush 85 has entered the brake control section, one is subtracted from the value of register ECOUNT which serves as an electric film counter (DEC ECOUNT). Step S74: If the value of the register ECOUNT resulting from the subtraction is not "2", the flow proceeds to a step S75. If the value is "2", the flow comes to a step S76. In other words, when the value of the register ECOUNT is "2", the flow proceeds to a different routine for controlling the termination of photographing. In this instance, the counter gear 88 which serves as a mechanical film counter shows "0" when the value of the register ECOUNT is "2". In other words, a film frame number indicator 88c shows "0" through a display window 89 provided in the camera body. Further, at the beginning of the prewinding action, a mark "E" on the film frame number indicator 88c of the counter gear 88 is located in a position corresponding to the display window 89. The photographable area of the film is arranged to begin at a point located at a distance of three frames from this mark "E". Since the register ECOUNT is arranged to be at its value "0" when this mark "E" is obtained. The photographable film area (frames) comes to an end when the value of the register ECOUNT is "3" (ECOUNT=3).

Step S75: Since the value of the register ECOUNT is not "2", the film still has photographable frame portions. Therefore, the brake is applied to the motor M1 to bring the film rewinding action to a stop. After that, the flow proceeds to the stop routine to wait for photographing on a next frame. The end of photographing is normally determined by this routine.

Step S76: Since the value of the register ECOUNT is "2", photographing can be regarded as completed for all the photographable frames. Therefore, the motor M1 is allowed to continue rotating in the normal direction to control the film being taken up into the film cartridge. Step S77: The timer TMR for detecting the stop of the film is reset to its initial value (TMR=0).

Figure 10D:
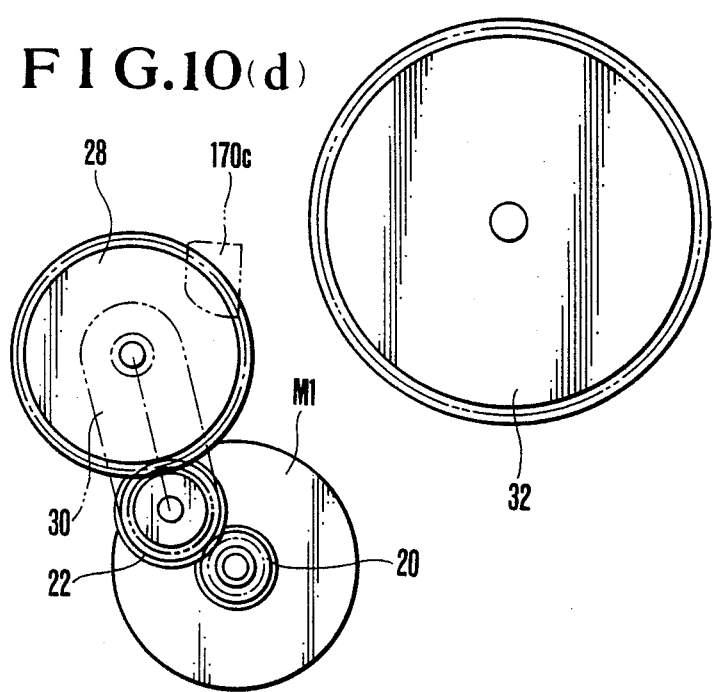

Steps S78 and S79: When the film ceases to move, the flow proceeds to a next step S80 like in the cases of the steps S13 and S22 described in the foregoing. In the case of the steps S78 and S79, the stop of the film movement means that the film has completely been taken up into the film cartridge. Step S80: The film rewinding action is stopped by brake application to the motor M1. Step S81: The motor M1 is rotated in the reverse direction for blank charging. Steps S82 and S83: Like n the case of the steps S32 and S33 described in the foregoing, the motor M1 is allowed to continue rotating in the reverse direction until the mirror driving gear 126 and the shutter charge gear 142 make one turn respectively. This blank charging process is performed mainly for enabling the change-over lever 170 to swing back to its initial position by setting free the planet gear 106 which has been caused to mesh with the rewinding gear 110 by the film rewinding action, as shown in FIG. 10(d).

Step S84: The blank charging action is brought to an end by brake application to the motor M1. The flag EFP which is used for deciding whether the prewinding action is to be carried out or not is set at "1" (EFP=1). By this, the camera is readied for the prewinding action to be performed when the camera is loaded with a roll of film next time. Further, the register ECOUNT which serves as an electric film counter is reset to its initial state (ECOUNT=0). After this, the flow comes to the stop routine of the step S47 and the control action comes to an end.

Next, the operation of the camera is further described as follows with importance attached to the operation of the mechanical arrangement thereof:

(Prewinding Action)

This embodiment is arranged to perform prior to photographing, the prewinding action by which all the frame portions of the frame portions of film are wound up beforehand, and then the film is rewound one by one at every shooting. When the back lid 70 is closed with a film cartridge loaded, the microcomputer CPU detects that fact through the back lid switch SWBP and causes the motor M1 to rotate clockwise (in the normal direction). The rotation of the motor M1 in the normal direction causes the planet gear 28 included in the transmission system on the side of the lower output shaft of the motor M1 to revolve. The planet gear 28 thus comes to mesh with the transmission gear 32 as shown in FIG. 10(a). This causes through the transmission gears 34 and 36 the sun gear 38 to rotate clockwise.

The rotation of the sun gear 38 in turn causes the first planet gear 40 to revolve. The gear 40 comes to mesh with the spool driving transmission gear 48. Meanwhile, the second planet gear 46 also revolves to come to mesh with the sprocket driving transmission gear 54 as shown in FIG. 3(a). That causes both the spool 52 and the driving sprocket 58 to rotate in the film winding direction. As a result, the leader part of the film F is first moved toward the spool 52 by the driving sprocket 58. Then, with the spool claws 52a coming to mesh with the perforation of the film F, the film is taken up onto the spool 52. Further, the planet gear 106 included in the transmission system on the side of the upper output shaft of the motor M1 tries to revolve in a direction in which it meshes with the rewind gear 110. However, under this condition, the movement of the planet gear 106 is prevented by the first restrictive projection 170b and is merely allowed to idly rotate, as shown in FIG. 9(a). With the leader part of the film F coming to be taken up onto the spool 52, the difference in the peripheral speed ratio between the transmission system on the side of the spool 52 and the transmission system on the side of the driving sprocket 58 causes the rotational frequency of the second planet gear 46 which is rotated by the drive of the motor M1 and that of the transmission gear 54 which is rotated by the driving sprocket 58 following the movement of the film to no longer coincide with each other. This causes the second planet lever 44 to jump clockwise (see FIG. 3(a)). The clockwise jumping of the second planet lever 44 causes the click part 44c to override the click projection 62b of the holding lever 62. As a result, the second planet gear 46 is kept in a state in which it does not mesh with the above-stated transmission gear 54, as shown in FIG. 3(b). After this, the film is wound by the drive of the spool 52 alone. This method enables the film F to be automatically loaded without fail, because: If the film is simply wound by the spool 52 alone from the beginning, the leader part of the film cannot be reliably transported to the spool 52. Whereas, the arrangement to have the film F driven by the driving sprocket 58 until the leader part of the film is wound onto the spool 52 ensures highly reliable automatic film loading. This is a great advantage.

After the film leader part is thus wound onto the spool 52, the driving sprocket 58 is no longer required to be driven and, therefore, the driving action is then automatically switched over to the spool 52 only. This arrangement of the embodiment is, therefore, highly advantageous in terms of efficient film winding. The peripheral speed ratio difference between the spool 52 and the driving sprocket 58 is preferably set in such a way as to ensure that the above-stated holding action on the second planet lever 44 is performed immediately after the film leader part is completely taken up onto the spool 52.

After this, the film winding action continues until all the frame portions of the film are wound up. This film winding action is arranged to be confirmable by the photographer through the intermittent advancing rotation of the counter gear 88 which is performed according to the driven rotation of the follower sprocket 80. As mentioned in the foregoing, the counter gear 88 is provided with a film frame number indicator 88c. The indicator 88c is arranged in combination with a display window 89 which is provided on the camera body as shown by a two-dot chain line in FIG. 2. The arrangement, therefore, enables the photographer to know that the film F is wound up by seeing changes taking place in a figure appearing in the window 89.

When the film F stretches after all the frame portions are taken up, the detection gear 84 which is associated with the follower sprocket 80 stops rotating. As a result, a film movement indicating signal which has been continuously supplied from the detection substrate 94 to the microcomputer CPU (see FIG. 6) ceases to be produced. This informs the microcomputer CPU of the end of film winding, and the rotation of the motor M1 is brought to a stop.

Following this, the motor M1 is caused to rotate counterclockwise (in the reverse direction). The rotation of the motor M1 in the reverse direction causes the planet gear 28 of the film winding system to revolve in a direction in which it moves away from the transmission gear 32. Meanwhile, the planet gear 106 which belongs to the transmission system on the side of the upper output shaft of the motor M1 is caused to revolve and come to mesh with the transmission gear 120 of the mirror-driving and shutter-charging driving system. This causes the mirror driving gear 126 and the shutter charge gear 142 to make one rotation. The movable mirror 134 is driven to change its state from the initial lowered state to its raised state and to the lowered state by one turn of the mirror driving gear 126. The shutter charge lever 146 is driven to change its state from its charging state to its charge canceling state and then to the charging state by one turn of the shutter charge gear 142. Then, a blank charging action is performed until a ground level signal is produced from the detection pattern 162 which is provided as a next shutter charge completion phase on the signal substrate 160 (see FIG. 8).

The blank charging action which is performed by the reverse rotation of the motor M1 relieves the changeover lever 170 from the state in which it is held in its initial position by the clamp lever 174 and allows the lever 170 to swing clockwise to shift its position to the positions one after another shown in FIGS. 7(a), 7(b) and 7(c). As a result, the first restrictive projection 170b comes away from its interposed position in between the planet gear 106 and the rewinding gear 110 as shown in FIG. 9(b). Meanwhile, the second restrictive projection part 170c comes in between the planet gear 28 and the transmission gear 32, as shown in FIG. 10(b). After that, therefore, the planet gear 106 and the rewinding gear 110 can mesh with each other when the motor M1 rotates in the normal direction. On the other hand, the rotation of the motor M1 in the normal direction does not allow the planet gear 28 to mesh with the transmission gear 32.

Next, the motor M1 is allowed to rotate in the normal direction, for the following reason: In order to ensure that the rewinding action to be performed thereafter on each frame portion of the film is accurately accomplished, the film must be rewound back to a dividing (or indexing) position. A figure of the film frame number indicator 88c of the counter gear 88 appearing under the condition thus obtained indicates a number of photographable frames.

The prewinding action is completed by the above-stated process. The camera remains in this condition until a shutter release operation is performed.

(Photographing Operation)

When the release switch SW2 is turned on with a pushing operation performed on the shutter release button 2 (see FIG. 1), the microcomputer CPU detects that fact and causes the motor M1 to rotate in the reverse direction. This causes the mirror driving gear 126 and the shutter charge gear 142 to rotate. The movable mirror 134 is raised and the shutter charge lever 146 acts to cancel the charge (see FIG. 7(b)). Then, the rotation of the motor M1 in the reverse direction is brought to a stop. The shutter is allowed to operate under this condition. Upon completion of the travel of the trailing group of shutter blades, the motor M1 is caused to further rotate in the reverse direction. Again the mirror driving gear 126 and the shutter charge gear 142 are rotated. This time, the movable mirror 134 is lowered and the shutter charge lever 146 is caused to perform its charging action as shown in FIG. 7(c). Upon completion of these actions, the motor M1 is brought to a stop. The motor M1 is then immediately controlled to rotate in the normal direction. The planet gear 106 of the transmission system on the side of the upper output shaft of the motor M1 then revolves to mesh with the rewind gear 110 to rewind the film. Further, when the motor M1 rotates in the normal direction, the planet gear 28 which belongs to the transmission system on the side of the lower output shaft of the motor M1 also revolves to try to mesh with the transmission gear 32. However, in this instance, the change-over lever 170 has moved clockwise to have the second restrictive projection 170c inserted in between the planet gear 28 and the transmission gear 32, as shown in FIG. 10(b). Therefore, the two gears 28 and 32 do not mesh with each other and the output of the motor M1 is not transmitted to the film winding transmission system.

When the film rewinding action is performed, the follower sprocket 80 rotates clockwise following the movement of the film (see FIG. 2). The detection gear 84 also rotates in synchronism with this. A little before the film F is rewound to an extent corresponding to one frame, the motor M1 is decelerated by a duty control driving action. When the film F is rewound exactly to the extent of one frame portion thereof, the motor M1 is brought to a stop by brake application control.

This brings the camera into a state of waiting for photographing on a next frame. The counter gear 88 rotates clockwise to a degree of one pitch to have its frame number display decremented by one.

After that, the actions mentioned above are repeated to carry out a photographing operation every time the shutter release button SW2 is pushed.

(Film being taken up into Cartridge)

Upon completion of the photographing operation, the electric film counter is checked to find whether the film frame number currently obtained is the second frame. If so, the motor M1 is controlled to rotate in the normal direction to have the film taken up into the film cartridge. The term "electric film counter" as used here means the counter (register ECOUNT) disposed in the microcomputer CPU. The electric counter is arranged to count up every time one frame portion of the film is taken up during the prewinding action and to count down every time one frame portion of the film is rewound. Further, the electric counter is used as a source of information for inhibiting photographing on a number of frame portions (three frame portions in the case of this embodiment) which have been exposed to light following the leader part of film at the beginning of the prewinding action and which correspond to a number of frame portions to be wound up in the initial stage of the ordinary conventional automatic film loading process. The rotation of the motor M1 is stopped upon detection that the follower sprocket 80 ceases to rotate either when the film F is completely taken up into the film cartridge or immediately before that.

Following this, a blank charging action is performed by causing the motor M1 to rotate in the reverse direction to cause the mirror driving gear 126 and the shutter charge gear 142 to rotate. The rotation of the motor M1 in the reverse direction is stopped when these gears make one turn (to come to the mirror-down phase passing through the mirror-up phase). The blank charging action is performed after the film has been taken up into the cartridge for the purpose of causing the planet gear 106 which has meshed with the rewind gear 110 by the above-stated film winding action to revolve and move toward the transmission gear 120; and also for causing the planet gear 28 to move by revolution away from the transmission gear 32. In other words, the blanking action is performed for the purpose of ensuring that the ensuing prewinding action is accurately performed with these gears 28 and 106 appropriately positioned for allowing the change-over lever 170 to swing (counterclockwise) back into its initial position when the back lid 70 is opened for replacing the film with a new film.

Since the planet gear 106 is revolved to shift its position toward the transmission gear 120 by the above-stated blank charging action, the reset lever 178 is caused to swing counterclockwise by the spring 180 when the back lid 70 is closed, as shown in FIG. 9(d). Then, the pushing projection 178b comes to push the upper end of the change-over lever 170 to cause the lever 170 to move counterclockwise (as the spring 180 is arranged to have a stronger spring force than that of the spring 172 which is exerting a clockwise urging force on the lever 170). The counterclockwise movement of the change-over lever 170 causes the clamp lever 174 to move with its pin 174c guided by the guide projection 170e. The latch claw 174a then comes to engage the clamp projection 170d. The change-over lever 170 thus comes back and locked in its initial position, as shown in FIGS. 2, 7(a), etc. Therefore, the first restrictive projection 170b which is disposed at the upper end part of the change-over lever 170 comes in between the planet gear 106 and the rewind gear 110 to inhibit them from meshing with each other when the motor M1 rotates in the normal direction. Meanwhile, the second restrictive projection 170c of the lever 170 stays away from its position between the planet gear 28 and the transmission gear 32 to allow them to come to mesh with each other when the motor M1 rotates in the normal direction.

When the back lid 70 is again closed after replacement of the film F, the reset lever 178 is pushed to swing clockwise by the pushing projection 70d of the back lid 70. This relieves the change-over lever 170 from a pushed state. However, since the change-over lever 170 is locked by the clamp projection 170d of the clamp lever 174 as mentioned above, the lever 170 continues to stay in its held position.

Further, when the back lid 70 is opened, the reset lever 60 in the film winding system is relieved from a state in which it is pushed by the pushing projection part 70b. Then, the reset spring 66 pushes the reset lever 60 to swing clockwise. Therefore, the holding lever 62 also swings clockwise as shown in FIG. 3(c). The pin 62a of the holding lever 62 then pushes the projection 44b of the second planetary lever 44 to cause the lever 44 to swing clockwise. This brings the second planet gear 46 back to its initial position where the gear 46 can mesh with the transmission gear 54. When the back lid 70 is again closed after this, no change occurs in the position of the second planetary lever 44 while there simply obtains the state of FIG. 3(a).

Further, with the back lid 70 closed, the counter reset lever 90 is relieved from its state of being pushed by the pushing projection 70c and is allowed to swing counterclockwise by the spring 92. Accordingly, the pushing part 90c of the counter reset lever 90 pushes the counter advancing shaft 86 in the direction opposite to the counter gear 88. This sets the counter gear 88 free to allow it to be moved clockwise by the force of a spring which is not shown back to a position where the initial position mark "E" becomes visible through the display window 89. The frame number indication is thus reset to its initial state. However, in the case of an ordinary photographing operation, the counter gear 88 has already been intermittently brought back to the above-stated initial position when the film is to be taken up into the film cartridge after completion of photographing on all the frame portions of the film. Therefore, the above-stated returning action which is performed by means of the above-stated spring is not required except in cases where the back lid 70 is opened during the process of, for example, a demonstrative photographing operation on the camera without loading it with any film.

In the case of the film winding driving mechanism of the embodiment described, the first planetary lever 42 and the second planetary lever 44 which are separately disposed, one in the transmission system on the side of the spool 52 and the other in the transmission system on the side of the driving sprocket 58, are arranged to have the sun gear 38 in common. This arrangement enables the embodiment to adequately cope with such a situation that the back lid 70 is opened under the film rewinding condition before completion of photographing for all the frame portions of the film and is then the back lid 70 is again closed to allow the film to be rewound. In other words, with the back lid 70 opened, the second planetary lever 44 is unlocked and becomes swingable to bring about a condition under which the second planet gear 46 is allowed to mesh with the transmission gear 54. Therefore, in rewinding the film, the planet gears 40 and 46 both come to rotate following the rotation of the spool 52 and that of the driving sprocket 58 caused by film rewinding (in the direction reverse to film winding rotation). Then, although the spool 52 and the driving sprocket 58 differ in peripheral speed ratio, i.e. the peripheral speed ratio of the spool 52 is larger, the arrangement to provide the planetary clutch mechanism also in the transmission system on the side of the spool 52 like in the case of this embodiment enables the first planetary lever 42 to swing to adequately disengage the planet gear 40 from the transmission gear 48.

Figure 12A:
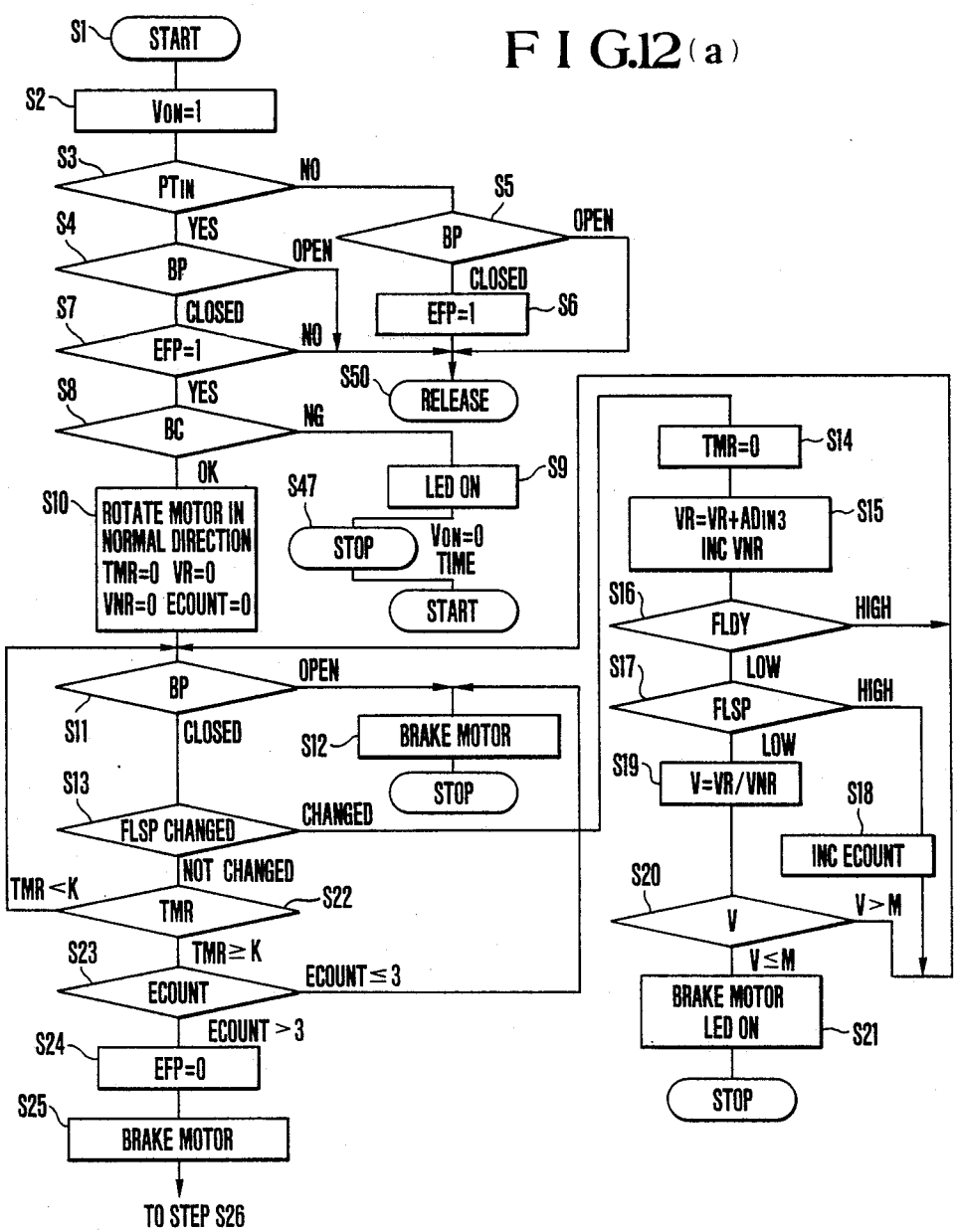
FIGS. 12(a), 12(b), 13(a) and 13(b) are flow charts.
Figure 12B:
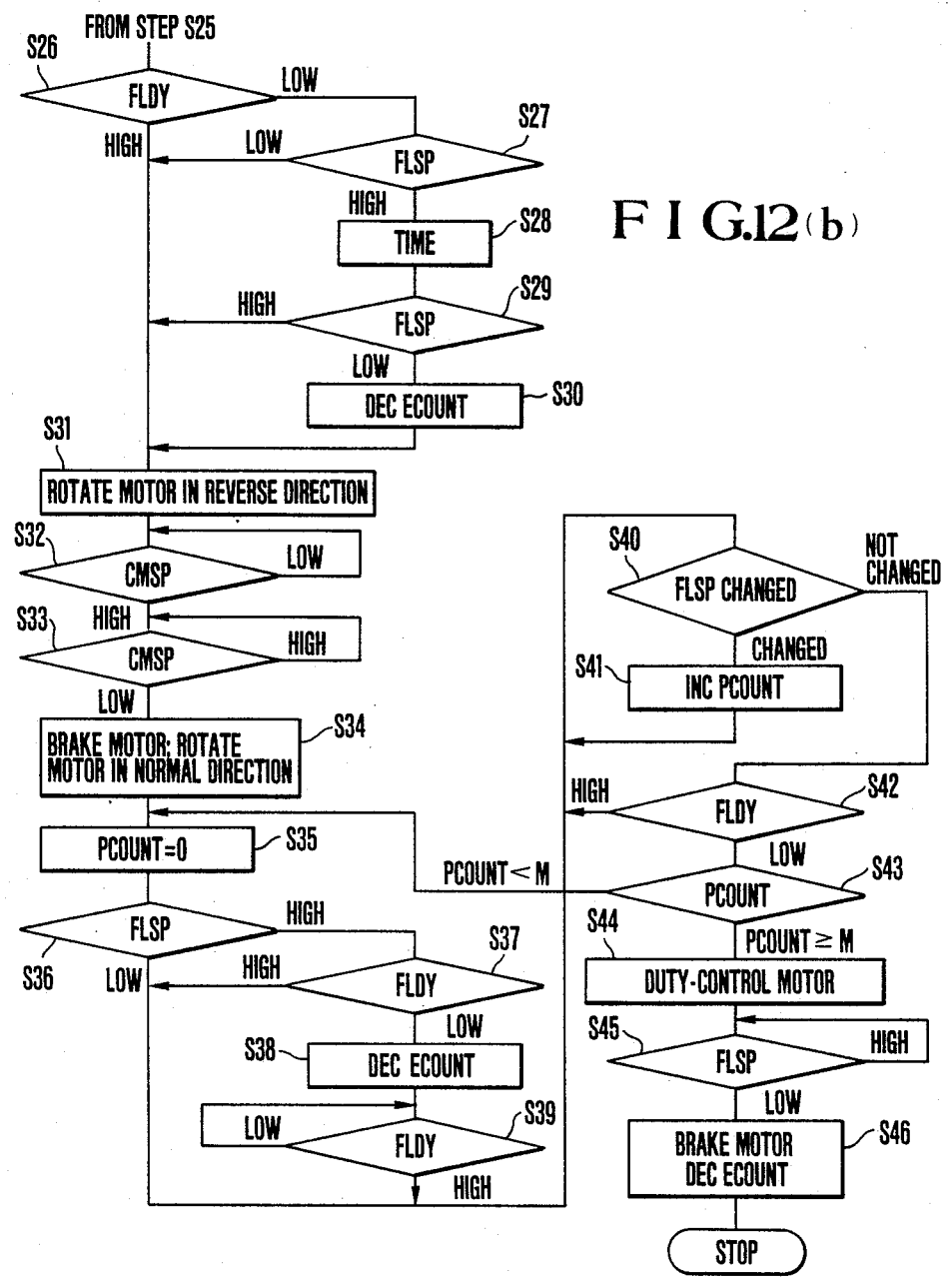

As apparent from the flow charts of FIGS. 12(a) and 12(b), all the frame portions of film can be wound onto the spool 52 by the prewinding action. Upon completion of the prewinding action, there obtains a stretched state of the film. As a result, the signal which has been generated by the movement of the film perforation stops to be generated any longer. Therefore, at the step S22, the flow branches out to a step S23. However, in the event of a failure in the automatic film loading due the to incorrect film loading on the spool 52 at the beginning of the prewinding action, the flow likewise branches out from the step S22 to S23 as the film also does not move. The step S23 is, therefore, provided for making a discrimination between the two conceivable causes for the immovable state of the film including the automatic film loading failure and the completion of the prewinding action. In other words, at the step S23, the register ECOUNT serving as the electric film counter is checked for the result of electric film counting action thereof. If the value of the register ECOUNT is greater than the predetermined value "3" thus indicating that four or more frame portions of film have already been wound by the prewinding action, the film is determined to have been completely taken up by the prewinding action. If the value of the register ECOUNT is found to be not greater than the predetermined value "3", it means that the amount of film wound up is three or less frame portions, thus indicating that the prewinding action has not completely been performed. In that case, the automatic film loading action onto the spool 52 is determined to have failed.

The predetermined value "3" is selected for the discriminating process, because: taking a safety margin into consideration, an amount of film which is likely to be exposed to light during the process of pulling the leader part of the film out of the film cartridge in loading the film onto the spool (a non-photographable amount of film) normally does not exceed three frame portions of the film. In the event of a roll of film which is cut to a short length including, for example, only five frame portions, it is only one or two frame portions that are actually usable for photographing. Even in such a case, the above-stated arrangement enables the embodiment to accurately make a discrimination between the failure of the automatic film loading and the completion of the prewinding action.

Further, since the prewinding action is to be continuously accomplished until all the frame portions of film are wound up, the embodiment is arranged to make a battery voltage check prior to the prewinding action and to allow this action to be carried out only when the power supply voltage is found to be at a predetermined level or above.

Further, the power supply voltage check is also arranged to be made after the start and during the process of the prewinding action. Then, if the voltage level is found to have dropped to a level below the predetermined level, the prewinding action is stopped and held in abeyance. The prewinding action is allowed to be resumed when the power supply voltage is again raised to the predetermined level or above by replacing the battery or the like, so that the film can be saved from being wasted.

Further, another advantage of the embodiment is as follows: In a case where the back lid of the camera is inadvertently opened during the process of the prewinding action, the prewinding action can be resumed when the back lid is again closed. Therefore, a photographable portion of film which still remains within the film cartridge when the back lid is inadvertently opened can be saved from being wasted.

What is claimed is:

1. A motor-driven camera of the prewind type in which, when loading a film, an automatic loading for automatically winding the film onto a take-up spool is performed, then a prewinding action for preliminary winding the film is consecutively performed and, after completion of the prewinding action, one frame of the film is rewound for every photographing shot, comprising:
   (a) an electric film counter for counting the number of frames of the film in response to the transport of the film;
   (b) detection means for detecting the movement of the film; and
   (c) a determining circuit for determining a state of the camera when said detection means has detected that the film is not moving,
   (c-1) said determining circuit determining the prewinding action to have been completed when a counted value of said electric film counter is greater than a predetermined value, and
   (c-2) said determining circuit determining the automatic loading to have failed when the counted value of said electric film counter is not greater than said predetermined value.

2. A camera according to claim 1, further comprising: a rewind circuit for rewinding the film to a small extent prior to photographing shot when said determining circuit has determined the prewinding action to have been completed.

3. A camera according to claim 1, further comprising: a stop circuit for stopping the transport of the film when said determining circuit has determined the automatic loading to have failed.

4. A camera according to claim 2, further comprising: a stop circuit for stopping the transport of the film when said determining circuit has determined the automatic loading to have failed.

5. A camera according to claim 1, further comprising: one-frame transport detecting means for detecting the transport of every one frame of the film; and a rewind circuit for rewinding the film to a small extent prior to photographing shot to adjust the phase of said one-frame transport detecting means when said determining circuit has determined the prewinding action to have been completed.

6. A camera according to claim 1, further comprising: a motor driving circuit for causing the automatic loading to start in response to closing of a back lid of the camera; a voltage detecting circuit for detecting a voltage of a power supply in response to closing of the back lid; and a control circuit for prohibiting an operation of said motor driving circuit to cause the automatic loading not to start when said voltage detecting circuit has detected that said voltage of the power supply is lower than a predetermined level.

7. A camera according to claim 1, further comprising: back lid detecting means for detecting opening and closing of a back lid of the camera; and a prewinding control circuit for controlling the prewinding action to be suspended or to be resumed, said control circuit causing the prewinding action to be suspended when opening of said back lid is detected by said back lid detecting means during the prewinding action and, after that, to be resumed when closing of said back lid is detected by said back lid detecting means.

8. A camera according to claim 1, further comprising: back lid detecting means for detecting opening and closing of a back lid of the camera; and a voltage detecting circuit for detecting a voltage of a power supply during the prewinding action; and a prewinding control circuit for controlling the prewinding action to be suspended or to be resumed according to the voltage detected by said voltage detecting circuit, said control circuit causing the prewinding action to be suspended when said voltage detecting circuit has detected that said voltage of the power supply is lower than a predetermined level and, after that, to be resumed when said voltage detecting circuit has detected that said voltage of the power supply is not lower than said predetermined level.

9. A camera according to claim 1, further comprising: a mechanical film counter for indicating the number of transported frames of the film, said mechanical film counter indicating the number of frames by using a rotary indicating plate.

10. A camera according to claim 9, wherein said electric film counter and said mechanical film counter are both arranged to perform counting actions by using a common member arranged to rotate according to the transport of the film.

11. A motor-driven camera of the prewind type in which, when loading a film, a leader part of the film is wound onto a take-up spool, a plurality of frames of the film are consecutively wound by a film winding action immediately following said leader part and, after that, one frame of the film is rewound for every photographing shot, comprising:
   (a) an electric film counter for counting the number of frames of the film according to the transport of the film;
   (b) detection means for detecting the movement of the film; and
   (c) a circuit for prohibiting a photographing operation when said detection means has detected that the film is not moving, said circuit being arranged to prohibit the photographing operation when a counted value of said electric film counter is not greater than a predetermined value.

12. A camera according to claim 11, wherein said circuit is arranged to permit the photographing operation when the counted value of said electric film counter is greater than said predetermined value.

13. A camera according to claim 12, further comprising: one-frame transport detecting means for detecting the transport of every one frame of the film; and a rewind circuit for rewinding the film to a small extent prior to photographing shot to adjust the phase of said one-frame transport detecting means when the counted value of said electric film counter is greater than said predetermined value.

14. A camera according to claim 11, further comprising: a voltage detecting circuit detecting a voltage of a power supply in response to closing of a back lid of the camera; and a control circuit for prohibiting an action of winding the leader part of the film onto the take-up spool when said voltage detecting circuit has detected that said voltage of the power supply is lower than a predetermined level.

15. A camera according to claim 11, further comprising: back lid detecting means for detecting opening and closing of a back lid of the camera; and a control circuit for controlling the film winding action to be suspended and to be resumed, said control circuit causing the film winding action to be suspended when said back lid detecting means has detected opening of said back lid during the film winding action and, after that, to be resumed when said back lid detecting means has detected closing of said back lid.

16. A camera according to claim 11, further comprising: back lid detecting means for detecting opening and closing of a back lid of the camera; a voltage detecting circuit for detecting a voltage of a power supply during the film winding action; and a control circuit for controlling the film winding action to be suspended and to be resumed during the film winding action according to the voltage detected by said voltage detecting circuit, said control circuit causing the film winding action to be suspended when said voltage detecting circuit has detected that said voltage of the power supply is lower than a predetermined level and, after that, to be resumed when said voltage detecting circuit has detected that said voltage of the power supply is not lower than said predetermined level.

17. A camera according to claim 11, further comprising: a mechanical film counter for indicating the number of transported frames of the film, said mechanical film counter indicating the number of frames by using a rotary indicating plate.

18. A camera according to claim 17, wherein said electric film counter and said mechanical film counter are both arranged to perform counting actions by using a common member arranged to rotate according to the transport of the film.

19. A camera according to claim 5, wherein said one-frame transport detecting means detects the transport of every one frame on the basis of a signal generated in response to a movement of the film.

20. A camera according to claim 7, wherein said back lid detecting means includes a switch which changes over an output signal thereof in response to a movement of the film.

21. A camera according to claim 8, wherein said back lid detecting means includes a switch which changes over an output signal thereof in response to a movement of the film.

22. A camera according to claim 11, wherein said detection means detects a movement of the film on the basis of a signal generated in response to the movement of the film.

23. A camera according to claim 13, wherein said one-frame transport detecting means detects the transport of every one frame on the basis of a signal in response to a movement of the film.

24. A camera according to claim 15, wherein said back lid detecting means includes a switch which changes over an output signal thereof in response to a movement of the film.

25. A camera according to claim 16, wherein said back lid detecting means includes a switch which changes over an output signal thereof in response to a movement of the film.

* * * * *

UNITED STATES PATENT AND TRADEMARK OFFICE
CERTIFICATE OF CORRECTION

PATENT NO. : 4,918,474
DATED : April 17, 1990
INVENTOR(S) : Masaharu Kawamura et al.

Figure 13A:
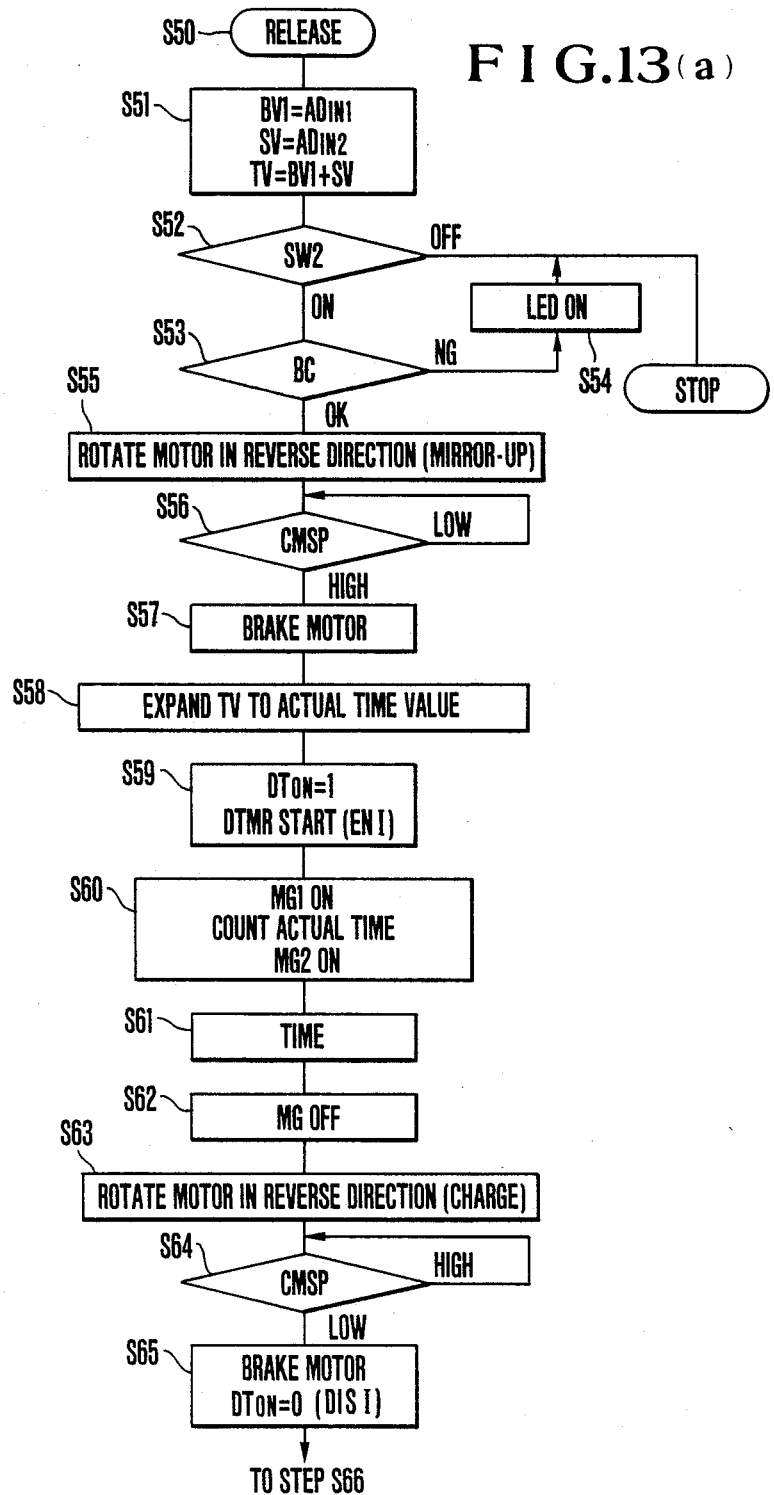
Figure 13B:
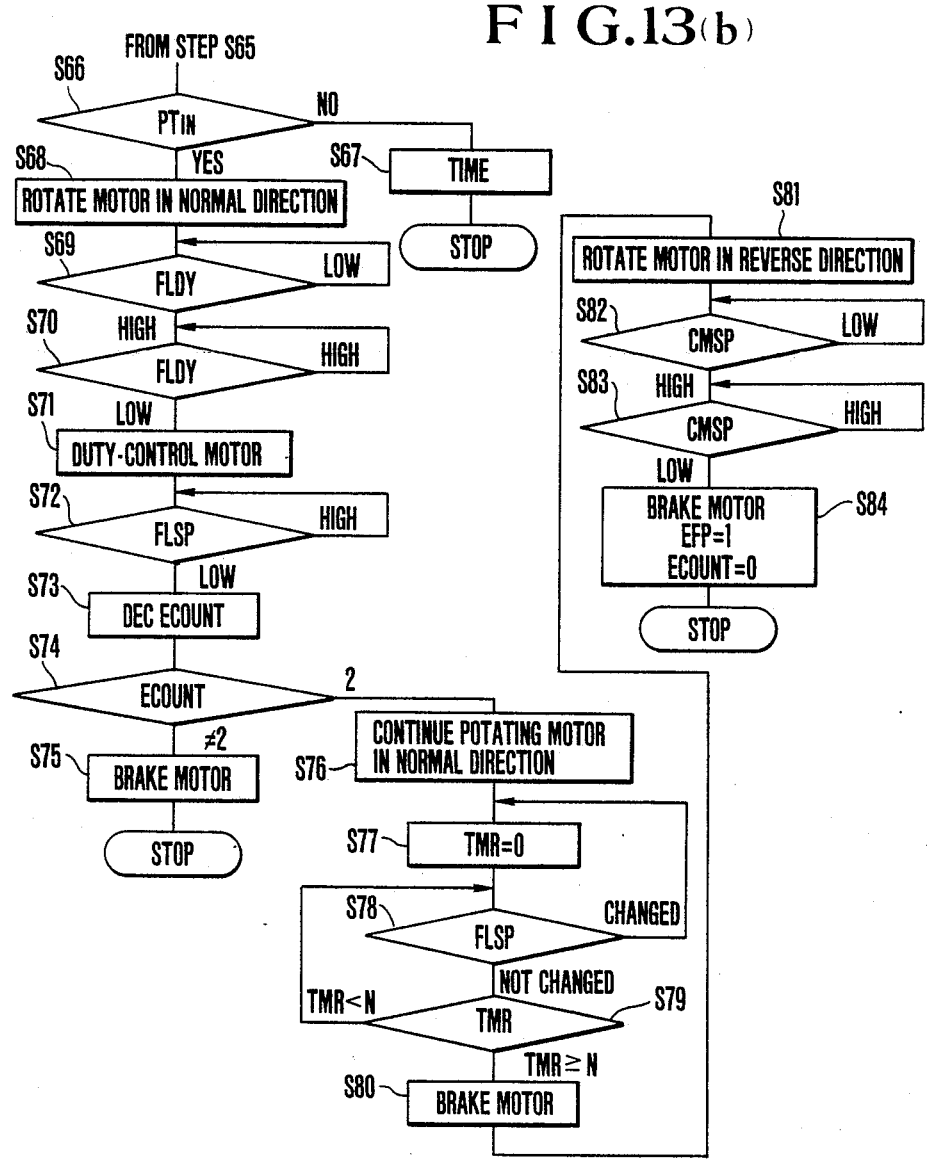

It is certified that error appears in the above-identified patent and that said Letters Patent is hereby corrected as shown below:

FIGURE 13(b):

In box S76, "POTATING" should read --ROTATING--.

COLUMN 1:

Line 19, "portion" should read --portions of--.

Line 39, "the perfor-" should read --the correct perfor- --.

COLUMN 3:

Line 12, "in" should be deleted.

COLUMN 5:

Line 27, "above stated" should read --above-stated--.

Line 40, "transmission gear 46." should read --transmission gear 54.--.

UNITED STATES PATENT AND TRADEMARK OFFICE
CERTIFICATE OF CORRECTION

PATENT NO. : 4,918,474

DATED : April 17, 1990

INVENTOR(S) : Masaharu Kawamura et al.

It is certified that error appears in the above-identified patent and that said Letters Patent is hereby corrected as shown below:

COLUMN 6:

Line 5, "follower gear 80." should read --follower sprocket 80.--.

Line 13, "advancing shift 86" should read --advancing shaft 86--.

Line 63, "advancing" should read --advance--.

COLUMN 7:

Line 11, "pattern 94a to 94d" should read --patterns 94a to 94d--.

COLUMN 10:

Line 30, "below:" should read --below.--.

COLUMN 11:

Line 18, "follows:" should read --follows.--.

Line 37, "7(c)" should read --7(c),--.

UNITED STATES PATENT AND TRADEMARK OFFICE
CERTIFICATE OF CORRECTION

PATENT NO. : 4,918,474

DATED : April 17, 1990

INVENTOR(S) : Masaharu Kawamura et al.

It is certified that error appears in the above-identified patent and that said Letters Patent is hereby corrected as shown below:

Line 49, "changeover lever1 170" should read
--change-over lever 170--.

COLUMN 12:

Line 30, "rest lever 178" should read --reset lever 178--.

COLUMN 13:

Line 17, "not" should read --now--.

COLUMN 16:

Line 36, "to" should read --by--.

COLUMN 18:

Line 6, "step 21." should read --step S21.--.

UNITED STATES PATENT AND TRADEMARK OFFICE
CERTIFICATE OF CORRECTION

PATENT NO. : 4,918,474
DATED : April 17, 1990
INVENTOR(S) : Masaharu Kawamura et al.

It is certified that error appears in the above-identified patent and that said Letters Patent is hereby corrected as shown below:

Line 15, "after "routine" insert --.--.

Line 18, "still retains in" should read --is still retained in--.

Line 22, "13," should read --S13,--.

Line 24, "step 11" should read --step S11--.

Line 43, "in apposite" should rear --inapposite--.

COLUMN 19:

Line 43, "step 31." should read --step S31.--.

Line 64, "on" should read --in--.

Line 68, "clamp lever 170" should read --clamp lever 174--.

COLUMN 20:

Line 29, "time" should read --time,--.

UNITED STATES PATENT AND TRADEMARK OFFICE
CERTIFICATE OF CORRECTION

PATENT NO. : 4,918,474

DATED : April 17, 1990

INVENTOR(S) : Masaharu Kawamura et al.

It is certified that error appears in the above-identified patent and that said Letters Patent is hereby corrected as shown below:

COLUMN 22:

Line 3, "digital value AD1N2" should read --digital value $AD_{IN2}$--.

Line 36, "motor 1" should read --motor M1--.

Line 48, " " " " should read --"  "--.

COLUMN 23:

Line 23, "magnet MG1 and MG2" should read --magnets MG1 and MG2--.

Line 37, "been" should be deleted.

COLUMN 24:

Line 38, "obtained. The" should read --obtained, the--.

Line 63, "n" should read --in--.

UNITED STATES PATENT AND TRADEMARK OFFICE
CERTIFICATE OF CORRECTION

PATENT NO. : 4,918,474

DATED : April 17, 1990

INVENTOR(S) : Masaharu Kawamura et al.

It is certified that error appears in the above-identified patent and that said Letters Patent is hereby corrected as shown below:

COLUMN 25:

Line 18, "thereof:" should read --thereof.--.

Line 21, "perform" should read --perform,--.

Line 35, "clockwise.¶ The" should read --clockwise. The--.

COLUMN 29:

Line 9, "back and locked" should read --back to and is locked--.

COLUMN 30:

Line 7, "is" should be deleted.

Line 34, "the to" should read --to the--.

UNITED STATES PATENT AND TRADEMARK OFFICE
CERTIFICATE OF CORRECTION

PATENT NO. : 4,918,474

DATED : April 17, 1990

INVENTOR(S) : Masaharu Kawamura et al.

It is certified that error appears in the above-identified patent and that said Letters Patent is hereby corrected as shown below:

COLUMN 31:

Line 32, "preliminary" should read --preliminarily--.

Signed and Sealed this

Twenty-third Day of June, 1992

Attest:

DOUGLAS B. COMER

*Attesting Officer*    *Acting Commissioner of Patents and Trademarks*